United States Patent
Kim

(10) Patent No.: US 11,800,597 B2
(45) Date of Patent: Oct. 24, 2023

(54) USER DATA COMPRESSION METHOD AND APPARATUS FOR PREVENTING DATA LOSS IN WIRELESS COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 76 days.

(21) Appl. No.: 17/460,807

(22) Filed: Aug. 30, 2021

(65) Prior Publication Data

US 2021/0392721 A1 Dec. 16, 2021

Related U.S. Application Data

(63) Continuation of application No. 16/870,179, filed on May 8, 2020, now Pat. No. 11,109,445.

(30) Foreign Application Priority Data

May 8, 2019 (KR) .................. 10-2019-0053577

(51) Int. Cl.
*H04W 80/08* (2009.01)
*H04L 1/1607* (2023.01)
(Continued)

(52) U.S. Cl.
CPC ........... *H04W 80/08* (2013.01); *H04L 1/1642* (2013.01); *H04W 28/06* (2013.01); *H04W 80/02* (2013.01)

(58) Field of Classification Search
None
See application file for complete search history.

(56) References Cited

U.S. PATENT DOCUMENTS

2016/0142518 A1* 5/2016 Raina .................. H04L 69/04
370/230
2016/0309364 A1 10/2016 Maheshwari et al.
(Continued)

FOREIGN PATENT DOCUMENTS

CN 107094142 A 8/2017
CN 107637121 A 1/2018
(Continued)

OTHER PUBLICATIONS

Ericsson, Release and Reset Behaviour for UDC, 3GPP TSG-RAN WG2 #97, R2-1713357, Nov. 16, 2017, Reno, USA, XP051371109.
(Continued)

*Primary Examiner* — Diane L Lo
(74) *Attorney, Agent, or Firm* — Jefferson IP Law, LLP

(57) ABSTRACT

A communication method and system for converging a $5^{th}$-Generation (5G) communication system for supporting higher data rates beyond a $4^{th}$-Generation (4G) system with a technology for Internet of Things (IoT) is provided. The disclosure may be applied to intelligent services based on the 5G communication technology and the IoT-related technology, such as smart home, smart building, smart city, smart car, connected car, health care, digital education, smart retail, security and safety services. The disclosure provides a method and an apparatus for preventing data loss.

16 Claims, 19 Drawing Sheets

(51) Int. Cl.
*H04W 80/02* (2009.01)
*H04W 28/06* (2009.01)

(56) References Cited

U.S. PATENT DOCUMENTS

| | | | |
|---|---|---|---|
| 2018/0359801 A1 | 12/2018 | Kim et al. | |
| 2018/0368200 A1 | 12/2018 | Jin et al. | |
| 2019/0090156 A1 | 3/2019 | Kim et al. | |
| 2019/0124181 A1 | 4/2019 | Park et al. | |
| 2019/0124677 A1 | 4/2019 | Kim et al. | |
| 2019/0141567 A1* | 5/2019 | Liu | H04L 69/04 |
| 2019/0149421 A1 | 5/2019 | Jin et al. | |
| 2019/0191332 A1 | 6/2019 | Kim et al. | |
| 2020/0107394 A1 | 4/2020 | Lee et al. | |
| 2020/0169916 A1 | 5/2020 | Gholmieh et al. | |
| 2020/0229026 A1 | 7/2020 | Parron et al. | |
| 2020/0296623 A1* | 9/2020 | Shreevastav | H04L 69/22 |
| 2020/0344644 A1* | 10/2020 | Liu | H04L 69/04 |
| 2020/0389812 A1* | 12/2020 | Chen | H04W 8/24 |
| 2020/0396640 A1 | 12/2020 | Quan et al. | |
| 2021/0084129 A1 | 3/2021 | Jiang | |

FOREIGN PATENT DOCUMENTS

| | | |
|---|---|---|
| CN | 108476435 A | 8/2018 |
| CN | 109041121 A | 12/2018 |
| CN | 109151903 A | 1/2019 |
| CN | 111316714 A | 6/2020 |
| CN | 111373789 A | 7/2020 |
| EP | 3 665 973 B1 | 8/2021 |
| KR | 10-2019-0032167 A | 3/2019 |

OTHER PUBLICATIONS

CATT, Introduction of Deflate based UDC Solution, 3GPP TSG-RAN2 Meeting #101bis, R2-1804564, Apr. 14, 2018, Sanya, China, XP051427870.
3rd Generation Partnership Project; Technical Specification Group Radio Access Network; Evolved Universal Terrestrial Radio Access (E-UTRA); Packet Data Convergence Protocol (PDCP) specification (Release 14), 3GPP TS 36.323 V14.5.0, Jan. 7, 2018, pp. 1-43, Sophia-Antipolis Cedex, France, XP051392411.
European Search Report dated Jan. 19, 2022, issued in European Application No. 20801560.2.
'3GPP; TSG RAN; E-UTRA; Study on UL data compression for E-UTRA (Release 15)', 3GPP TR 36.754 V15.1.0, Sep. 26, 2017, section 7.2.4.1.2; and figure 7.2.4.1.2-4.
'3GPP; TSG RAN; E-UTRA; PDCP specification (Release 15)', 3GPP TS 36.323, V15.3.0, Apr. 9, 2019, sections 4.4, 5.1.1, 5.1.2. 1.4.1, 5.4, 5.11-5.11.7.
Huawei, 'Further discussion on the Ethernet header compression solutions', R2-1901417, 3GPP TSG RAN WG2 Meeting #105, Athens, Greece, Feb. 14, 2019 section 2.
Ericsson, 'Update of UDC PDCP Control PDU', R2-1805274, 3GPP TSG-RAN WG2 #101b, Sanya, China, Apr. 6, 2018 section 3.
International Search Report dated Aug. 24, 2020, issued in International Patent Application No. PCT/KR2020/006061.
CATT, Presentation of Specification/Report to TSG: TR 36.754-v1.0.0, RP-171139, 3GPP TSG-RAN Meeting #76, May 29, 2017, West Palm Beach, USA.
CATT, Introduction of Deflate based UDC Solution, R2-1804565, TS36331_CR3211r2_(Rel-15), 3GPP TSG RAN WG2 Meeting #101bis, Apr. 5, 2018, Sanya, China.
European Office Action dated Feb. 13, 2023, issued in European Application No. 20801560.2.
Chinese Office Action dated Feb. 27, 2023, issued in Chinese Application No. 202080034019.1.

* cited by examiner

USER DATA COMPRESSION METHOD AND APPARATUS FOR PREVENTING DATA LOSS IN WIRELESS COMMUNICATION SYSTEM

CROSS-REFERENCE TO RELATED APPLICATION(S)

This application is a continuation application of prior application Ser. No. 16/870,179, filed on May 8, 2020, which is based on and claims priority under 35 U.S.C. § 119(a) of a Korean patent application number 10-2019-0053577, filed on May 8, 2019, in the Korean Intellectual Property Office, the disclosure of which is incorporated by reference herein in its entirety.

BACKGROUND

1. Field

The disclosure relates to a method and an apparatus for preventing data loss when an uplink user data compression process is performed in a wireless communication system.

2. Description of Related Art

To meet the increasing demand for wireless data traffic since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'. The 5G communication system is intended to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antennas, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

According to the recent development of communication systems, various research has progressed on uplink data compression (UDC), and an improvement for preventing uplink and downlink data loss is required.

The above information is presented as background information only to assist with an understanding of the disclosure. No determination has been made, and no assertion is made, as to whether any of the above might be applicable as prior art with regard to the disclosure.

SUMMARY

In downlink transmission of a wireless communication system, a high frequency band and wide bandwidth are used and thus more transmission resources can be ensured. In addition, in a base station, more antennas can be physically installed and used, and thus beamforming gain and high signal strength may be obtained. Therefore, a base station can load more data on the same frequency/time resources and then transmit the same to a terminal through a downlink. However, in a case of the uplink transmission, a terminal has a physically small size, and it is difficult to use high frequency band and wide bandwidth as the uplink frequency. Therefore, uplink transmission resources may have bottlenecks compared to downlink transmission resources. In addition, a terminal has maximum transmission power much smaller than that of a base station, and thus has also a problem in that the coverage is small when transmitting uplink data. Therefore, transmission resources are required to be efficiently used through compression of uplink data.

Aspects of the disclosure are to address at least the above-mentioned problems and/or disadvantages and to provide at least the advantages described below. Accordingly, an aspect of the disclosure is to provide an apparatus and a method for compressing uplink data employs a scheme of successively compressing data, based on previous data. Therefore, if one piece of data among a series of pieces of compressed data is lost or discarded, or fails to be decompressed, a reception node fails to decompress all the data after the piece of data that is lost or discarded, or fails to be decompressed.

A transmission node packet data convergence protocol (PDCP) layer device may: drive a PDCP discard timer for each data every time when data is received from an upper layer device, perform an uplink compression process if the uplink compression process is configured, configure a UDC header, encode data to which uplink data compression has been performed, and assign a PDCP sequence number and configure a PDCP header to generate a PDCP protocol data unit (PDCP PDU). If the PDCP discard timer has expired, data corresponding to the timer is assumed as not being valid any more, and then discarded.

Therefore, if a transmission PDCP layer device has discarded previously generated data (e.g., PDCP PDU) due to the expiration of the PDCP discard timer, particular data is discarded among a series of pieces of compressed data. Therefore, a reception PDCP layer device may fail in successive data decompression due to the discard or loss of the compressed data.

Additional aspects will be set forth in part in the description which follows and, in part, will be apparent from the description, or may be learned by practice of the presented embodiments.

In accordance with an aspect of the disclosure, a method performed by a transmitting device is provided. The method includes receiving, from a receiving device, a packet data convergence protocol (PDCP) control protocol data unit (PDU) including information indicating a check sum failure, discarding a first PDCP PDU based on the information, the first PDCP PDU not being submitted to a lower layer and PDCP processing being performed for, delivering a first indicator to the lower layer, the first indicator indicating a discard of data which was delivered to the lower layer, performing a first PDCP processing for a PDCP service data unit (SDU) corresponding to the first PDCP PDU, and transmitting, to the receiving device, a second PDCP PDU generated based on the first PDCP processing.

In accordance with another aspect of the disclosure, a method performed by a receiving device is provided. The method includes identifying that a check sum failure has occurred, transmitting, to a transmitting device, a packet data convergence protocol (PDCP) control protocol data unit (PDU) including information indicating the check sum failure, receiving, from the transmitting device, a first PDCP PDU after transmitting of the PDCP control PDU, and discarding at least one PDCP PDU from the first PDCP PDU, wherein a PDCP header of the discarded at least one PDCP PDU does not include a first indicator indicating a reset of a uplink data compression (UDC) buffer of the transmitting device.

In accordance with another aspect of the disclosure, a transmitting device is provided. The transmitting device includes a transceiver configured to transmit and receive a signal, and a controller configured to: receive, from a receiving device, a packet data convergence protocol (PDCP) control protocol data unit (PDU) including information indicating a check sum failure, discard a first PDCP PDU based on the information, the first PDCP PDU not being submitted to a lower layer and PDCP processing being performed for, deliver a first indicator to the lower layer, the first indicator indicating a discard of data which was delivered to the lower layer, perform a first PDCP processing for a PDCP service data unit (SDU) corresponding to the first PDCP PDU, and transmit, to the receiving device, a second PDCP PDU generated based on the first PDCP processing.

In accordance with another aspect of the disclosure, a receiving device is provided. The receiving device includes a transceiver configured to transmit and receive a signal, and a controller configured to: identify that a check sum failure has occurred, transmit, to a transmitting device, a packet data convergence protocol (PDCP) control protocol data unit (PDU) including information indicating the check sum failure, receive, from the transmitting device, a first PDCP PDU after transmitting of the PDCP control PDU, and discard at least one PDCP PDU from the first PDCP PDU, wherein a PDCP header of the discarded at least one PDCP PDU does not include a first indicator indicating a reset of a uplink data compression (UDC) buffer of the transmitting device.

In accordance with another aspect of the disclosure, a process in which when a transmission PDCP layer device (terminal or base station) transmits data through uplink or downlink in a wireless communication system is provided. The transmission PDCP layer device compresses and transmits the data and a reception PDCP layer device (base station or terminal) receives and decompresses the data.

In accordance with another aspect of the disclosure, a method for supporting a data transmission/reception process in which a transmission node is provided. The method compresses and transmits data and a reception node decompresses the data, the method including a specific header format, a solution of decompression failure, and a solution of discarding by a PDCP discard timer in a transmission PDCP layer device. In addition, a proposed embodiment may be also applied to a process in which when a base station transmits downlink data to a terminal, the base station compresses and transmits the data and the terminal receives and decompresses the compressed downlink data. As described above, in the disclosure, a transmission node compresses and transmits data, and thus can transmit more data and improve the coverage at the same time.

In addition, if an uplink data compression (UDC) process is configured, a transmission PDCP layer device performs a data compression process on pieces of data received from an upper layer device, and then stores the pieces of data to transmit same when an uplink transmission resource is received. In this situation, if data having been subjected to UDC compression and having not been transmitted yet is discarded due to the expiration of a PDCP discard timer, a reception PDCP layer device fails on UDC decompression of pieces of data having been subjected to UDC compression among pieces of data each having a PDCP sequence number larger than that of the discarded data, and thus all the pieces of data are lost. Therefore, the disclosure proposes a solution for solving the problem.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages, reference of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
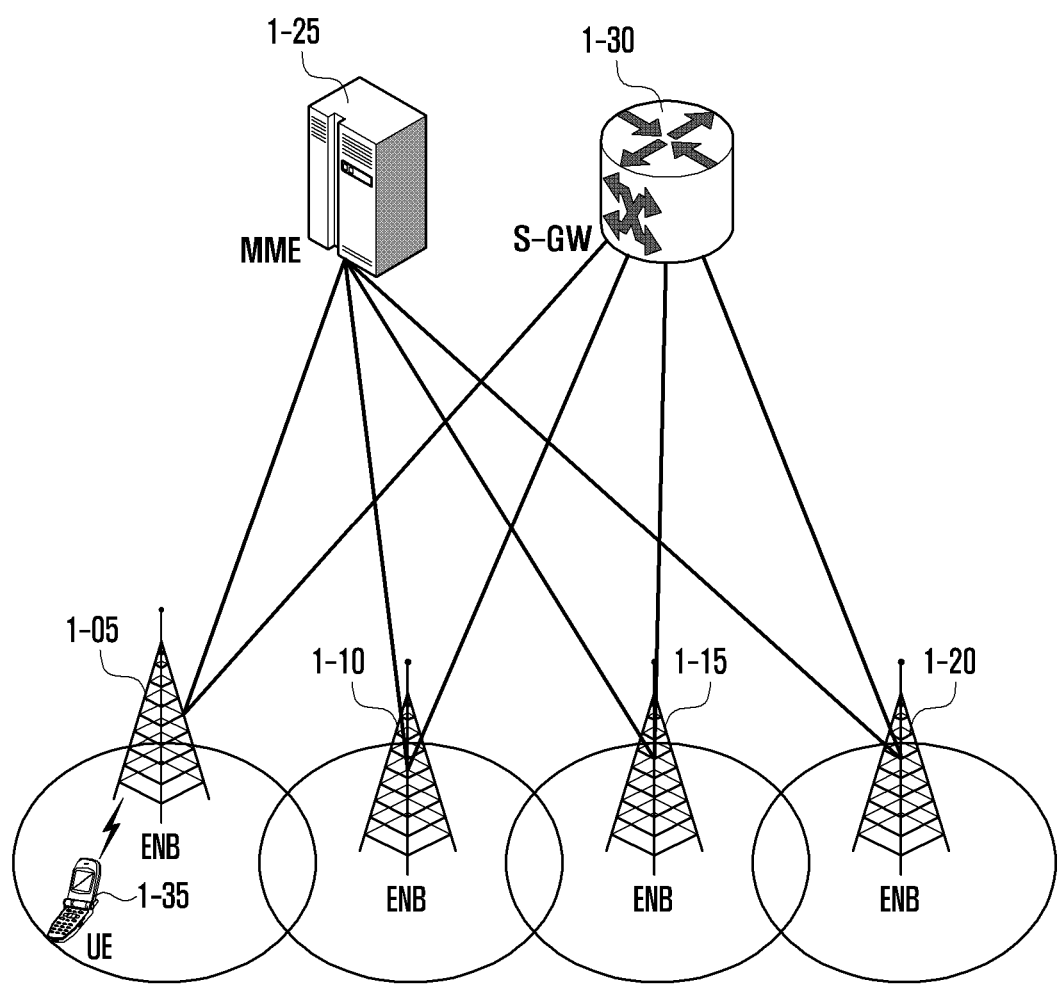
FIG. 1 is a diagram illustrating a structure of an LTE system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to make the disclosure complete and clearly inform those skilled in the art of the scope of the disclosure, and the disclosure is defined only by the scope of the appended claims. Throughout the specification, the same reference numerals designate the same elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block(s). These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operations to be performed on the computer or other programmable data processing apparatus to produce a computer implemented process such that the instructions that execute on the computer or other programmable data processing apparatus provide operations for implementing the functions specified in the flowchart block(s).

Each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession can in fact be executed substantially concurrently or the blocks can sometimes be executed in the reverse order, depending upon the functionality involved.

As used herein, the "unit" or "module" refers to a software element or a hardware element, such as a field programmable gate array (FPGA) or an application specific integrated circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms as described below are defined in consideration of the functions in the disclosure, and the meaning of the terms may vary according to the intention of a user or operator, convention, or the like. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments will be described with reference to the accompanying drawings.

In the following description, a term for identifying an access node, terms for indicating network entities, terms for indicating messages, a term for indicating an interface between network entities, terms for indicating various identification information, and the like are examples for convenience of explanation. Therefore, the disclosure may not be limited by the terminologies provided below, and other terms that indicate subjects having equivalent technical meanings may be used.

For convenience of description, terms and names defined in 3rd generation partnership project (3GPP) LTE standards will be used in the disclosure. However, the disclosure is not limited to the terms and names, and may be applied to a system following other standards in the same way. In the disclosure, an evolved node B (eNB) may be used together with a next generation node B (gNB) for convenience of explanation. That is, a base station described as an eNB may indicate a gNB.

FIG. 1 is a diagram illustrating a structure of an LTE system according to an embodiment of the disclosure.

Referring to FIG. 1, as illustrated, a wireless access network of an LTE system includes next generation base stations (an ENB, a Node B, or a base station) 1-05, 1-10, 1-15, and 1-20, a mobility management entity (MME) 1-25, and a serving gateway (S-GW) 1-30. A user equipment (hereinafter, UE or terminal) 1-35 accesses an external network through the ENBs 1-05 to 1-20 and the S-GW 1-30.

In FIG. 1, the ENBs 1-05 to 1-20 correspond to a node B of a universal mobile telecommunication system (UMTS). An ENB is connected to the UE 1-35 through a wireless channel and performs complex functions compared to a node B. In the LTE system, all the user traffic including real-time service such as a voice over IP (VoIP) through an Internet protocol is serviced through a shared channel Therefore, the LTE system requires a device configured to collect pieces of state information including a buffer state, an available transmission power state, and a channel state of UEs and perform scheduling, and the ENBs 1-05 to 1-20 serves as the device. One ENB generally controls a plurality of cells. For example, a LTE system uses, as a wireless access technology, for example, orthogonal frequency division multiplexing (hereinafter, referred to as OFDM) in a bandwidth of 20 MHz in order to implement a transfer rate of 100 Mbps. Further, an adaptive modulation and coding (hereinafter, referred to as an AMC) scheme for determining a modulation scheme and a channel coding rate according to a channel state of a terminal is employed. The S-GW 1-30 is a device configured to provide a data bearer, and generates or removes a data bearer according to a control of the MME 1-25. The MME is an apparatus which is responsible for various control functions as well as a mobility management function for a terminal, and is connected to a plurality of base stations.

Figure 2:
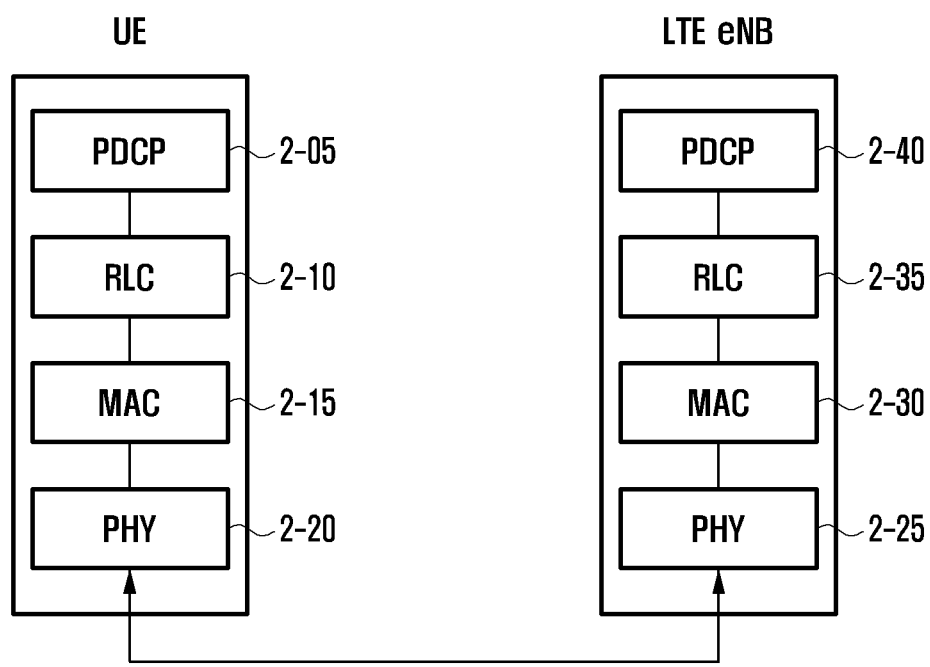
FIG. 2 is a diagram illustrating a wireless protocol structure of an LTE system to which the disclosure may be applied according to an embodiment of the disclosure.

FIG. 2 is a diagram illustrating a wireless protocol structure of an LTE system according to an embodiment of the disclosure.

Referring to FIG. 2, a wireless protocol of an LTE system includes a packet data convergence protocol (PDCP) 2-05 or 2-40, a radio link control (RLC) 2-10 or 2-35, and a medium access control (MAC) 2-15 or 2-30 in each of a terminal and an ENB. The packet data convergence protocol (PDCP) 2-05 or 2-40 is configured to perform an operation of compressing/reconstructing an IP header. Main functions of the PDCP are summarized as below.

Header compression and decompression (ROHC only)
Transfer of user data
In-sequence delivery (In-sequence delivery of upper layer PDUs at PDCP re-establishment procedure for RLC AM)
Reordering (For split bearers in DC (only support for RLC AM): PDCP PDU routing for transmission and PDCP PDU reordering for reception)
Duplicate detection (Duplicate detection of lower layer service data units (SDUs) at PDCP re-establishment procedure for RLC AM)
Retransmission (Retransmission of PDCP SDUs at handover and, for split bearers in DC, of PDCP PDUs at PDCP data-recovery procedure, for RLC AM)
Ciphering and deciphering
Timer-based SDU discard (Timer-based SDU discard in uplink)

The radio link control (hereinafter, referred to as RLC) 2-10 or 2-35 reconfigures a PDCP protocol data unit (PDCP PDU) to have a proper size and then performs an automatic repeat request (ARQ) operation. Main functions of the RLC are summarized as below.

Data transfer (Transfer of upper layer PDUs)
ARQ (Error Correction through ARQ (only for acknowledged mode (AM) data transfer))

Concatenation, segmentation, and reassembly (Concatenation, segmentation, and reassembly of RLC SDUs (only for unacknowledged mode (UM) and AM data transfer))

Re-segmentation (Re-segmentation of RLC data PDUs (only for AM data transfer))

Reordering (Reordering of RLC data PDUs (only for UM and AM data transfer)

Duplicate detection (Duplicate detection (only for UM and AM data transfer))

Error detection (Protocol error detection (only for AM data transfer))

RLC SDU (only for UM and AM data transfer)

RLC re-establishment

The MAC 2-15 or 2-30 is connected to several RLC layer devices configured in a single terminal, multiplexes RLC PDUs to a MAC PDU, and demultiplexes a MAC PDU to RLC PDUs. Main functions of the MAC are summarized as below.

Mapping (Mapping between logical channels and transport channels)

Multiplexing and demultiplexing (Multiplexing/demultiplexing of MAC SDUs belonging to one or different logical channels into/from transport blocks (TB) delivered to/from the physical layer on transport channels)

Scheduling information reporting

HARQ (Error correction through HARQ (hybrid ARQ))

Priority handling between logical channels (Priority handling between logical channels of one UE)

Priority handling between UEs (Priority handling between UEs by means of dynamic scheduling)

Multimedia broadcast multicast services (MBMS) identification

Transport format selection

Padding

A physical layer 2-20 or 2-25 performs channel coding and modulation on upper layer data to make the data into an OFDM symbol and transmit the OFDM symbol through a wireless channel, or performs demodulation and channel decoding on an OFDM symbol received through a wireless channel, and then transfers the OFDM symbol to an upper layer.

Figure 3:
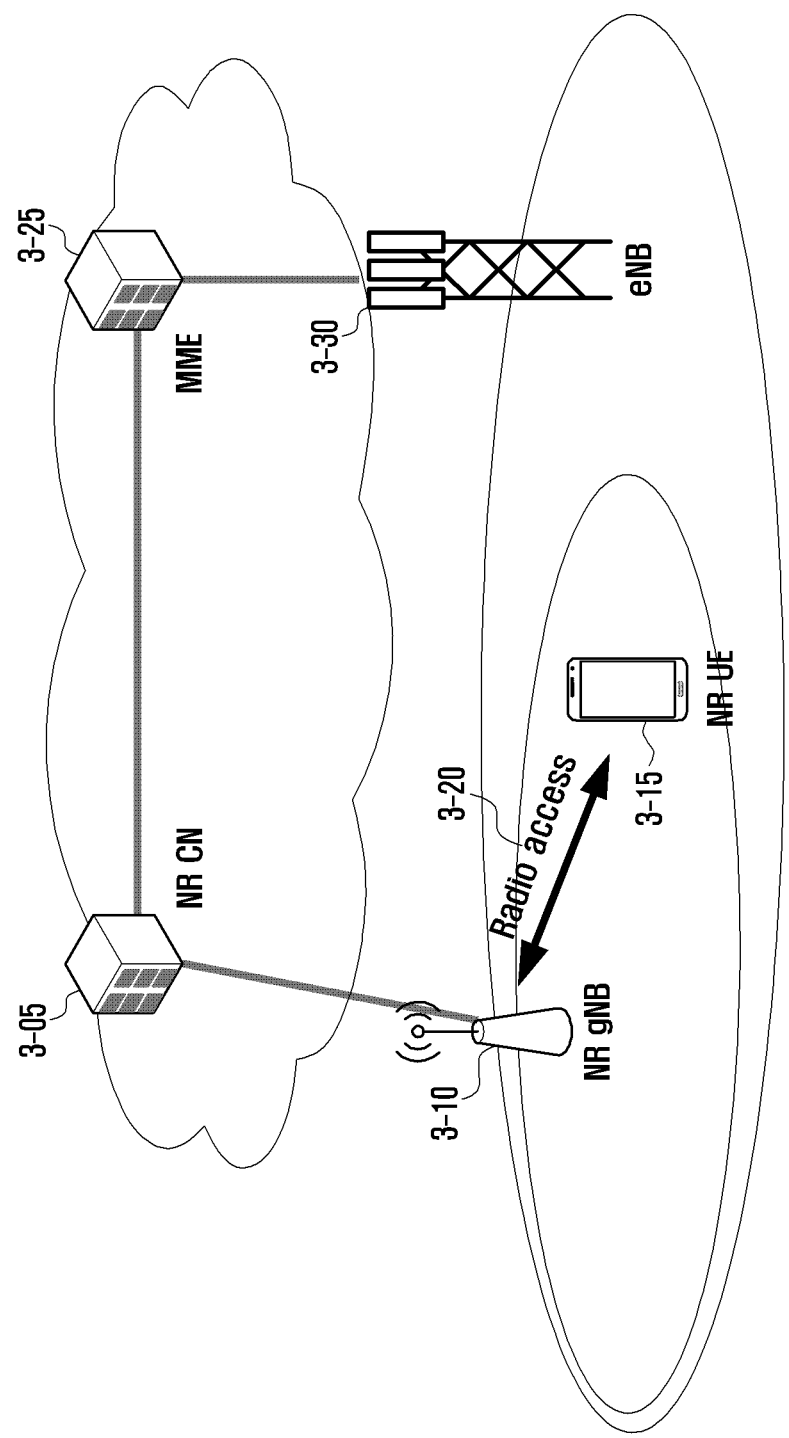
FIG. 3 is a diagram illustrating a structure of a next generation mobile communication system according to an embodiment of the disclosure.

FIG. 3 is a diagram illustrating a structure of a next generation mobile communication system according to an embodiment of the disclosure.

Referring to FIG. 3, as illustrated, a wireless access network of a next generation mobile communication system (hereinafter, NR or 5G) includes a next generation base station (new radio node B, hereinafter, NR gNB or NR base station) 3-10 and a new radio core network (NR CN) 3-05. A user terminal (new radio user equipment, hereinafter, NR UE or terminal) 3-15 accesses an external network through a NR gNB 3-10 and the NR CN 3-05.

In FIG. 3, the NR gNB 3-10 corresponds to an evolved node B (eNB) of a LTE system. The NR gNB 3-10 is connected to the NR UE 3-15 through a wireless channel 3-20 and may provide an outstanding service compared to a node B. In the NR system, all the user traffic is serviced thorough shared channels. Therefore, the NR system requires a device configured to collect pieces of state information including a buffer state, an available transmission power state, and a channel state of UEs and perform scheduling, and the NR NB 3-10 serves as the device. One NR gNB generally controls a plurality of cells. In order to implement very-high-speed data transfer compared to the current LTE, the NR gNB may have a bandwidth wider than the maximum bandwidth, may employ orthogonal frequency division multiplexing (OFDM) as a wireless access technology, and a beamforming technology may be additionally integrated therewith. Further, an adaptive modulation and coding (AMC) scheme for determining a modulation scheme and a channel coding rate according to a channel state of a terminal is employed. The NR CN 3-05 performs functions such as mobility support, bearer configuration, and quality of service (QoS) configuration. The NR CN is an apparatus which is responsible for various control functions as well as a mobility management function for a terminal, and is connected to a plurality of base stations. Also, the NR system may be also linked to an existing LTE system, and the NR CN is connected to an MME 3-25 through a network interface. The MME is connected to an eNB 3-30 that is an existing base station.

Figure 4:
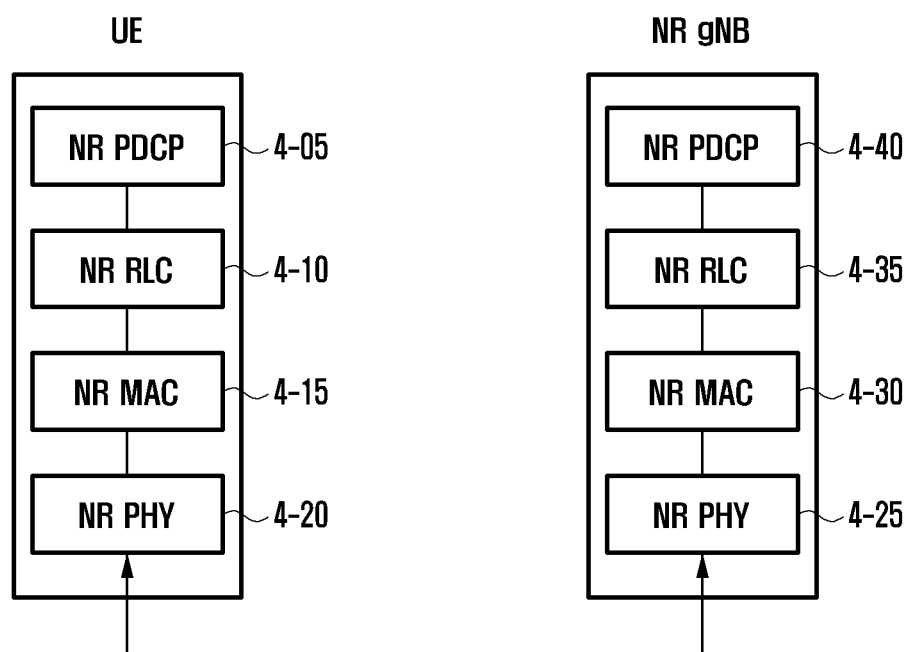
FIG. 4 is a diagram illustrating a wireless protocol structure of a next generation mobile communication system according to an embodiment of the disclosure.

FIG. 4 is a diagram illustrating a wireless protocol structure of a next generation mobile communication system according to an embodiment of the disclosure.

Referring to FIG. 4, a wireless protocol of a next generation mobile communication system (NR system) includes a NR PDCP 4-05 or 4-40, an NR RLC 4-10 or 4-35, and an NR MAC 4-15 or 4-30 in each of a terminal and an NR base station. Main functions of the NR PDCP 4-05 or 4-40 may include a part of functions below.

Header compression and decompression (ROHC only)

Transfer of user data

In-sequence delivery (In-sequence delivery of upper layer PDUs)

Out-of-sequence delivery (Out-of-sequence delivery of upper layer PDUs)

Reordering (PDCP PDU reordering for reception)

Duplicate detection (Duplicate detection of lower layer SDUs)

Retransmission (Retransmission of PDCP SDUs)

Ciphering and deciphering

Timer-based SDU discard (Timer-based SDU discard in uplink)

The reordering function of the NR PDCP device may indicate a function of rearranging PDCP PDUs received from a lower layer, in an order based on a PDCP sequence number (SN). Further, the reordering function may include a function of transferring data to an upper layer according to a rearranged order, or may include a function of directly transferring data without considering order, may include a function of rearranging an order to record lost PDCP PDUs, may include a function of reporting the state of lost PDCP PDUs to a transmission side, and may include a function of requesting retransmission of lost PDCP PDUs.

Main functions of the NR RLC 4-10 or 4-35 may include a part of functions below.

Data transfer (Transfer of upper layer PDUs)

In-sequence delivery (In-sequence delivery of upper layer PDUs)

Out-of-sequence delivery (Out-of-sequence delivery of upper layer PDUs)

ARQ (Error correction through ARQ)

Concatenation, segmentation and reassembly (Concatenation, segmentation and reassembly of RLC SDUs)

Re-segmentation (Re-segmentation of RLC data PDUs)

Reordering (Reordering of RLC data PDUs)

Duplicate detection

Error detection (Protocol error detection)

RLC SDU discard

RLC re-establishment

The in-sequence delivery function of the NR RLC device may indicate a function of transferring RLC SDUs received from a lower layer, to an upper layer in an order. Furthermore, the in-sequence delivery function may include a function of, if one original RLC SDU is divided into several RLC SDUs and then the RLC SDUs are received, reassembling the several RLC SDUs and transferring the reassembled RLC SDUs; may include a function of rearranging received RLC PDUs with reference to a RLC sequence number (SN) or a PDCP sequence number (SN); may include a function of rearranging an order to record lost RLC PDUs; may include a function of reporting the state of lost RLC PDUs to a transmission side; and may include a function of requesting retransmission of lost RLC PDUs. Moreover, the in-sequence delivery function may include a function of, if there is a lost RLC SDU, transferring only RLC SDUs before the lost RLC SDU, to an upper layer in an order; may include a function of, although there is a lost RLC SDU, if a predetermined timer is expired, transferring all the RLC SDUs received before the timer is started, to an upper layer in an order; or may include a function of although there is a lost RLC SDU, if a predetermined timer is expired, transferring all the RLC SDUs received up to the current, to an upper layer in an order. In addition, the NR RLC device may process RLC PDUs in a reception order (i.e., an order in which the RLC PDUs have arrived, regardless of an order based on a sequence number (SN)) and then transfer the processed RLC PDUs to a PDCP device regardless of the order (out-of-sequence delivery). In a case of segments, the NR RLC device may receive segments stored in a buffer or to be received in the future, reconfigure the segments to be one whole RLC PDU, then process the RLC PDU, and transfer the processed RLC PDU to a PDCP device. The NR RLC layer may not include a concatenation function, and the concatenation function may be performed in an NR MAC layer or replaced with a multiplexing function of an NR MAC layer.

The out-of-sequence delivery function of the NR RLC device may mean a function of directly transferring RLC SDUs received from a lower layer, to an upper layer regardless of an order. Furthermore, the out-of-sequence delivery function may include a function of, if one original RLC SDU is divided into several RLC SDUs and then the RLC SDUs are received, reassembling the several RLC SDUs and transferring the reassembled RLC SDUs; and may include a function of storing a RLC sequence number (SN) or a PDCP sequence number (SN) of received RLC PDUs and arranging an order to record lost RLC PDUs.

The NR MAC 4-15 or 4-30 may be connected to several NR RLC layer devices configured in a single terminal, and main functions of the NR MAC may include a part of functions below.
  Mapping (Mapping between logical channels and transport channels)
  Multiplexing and demultiplexing (Multiplexing/demultiplexing of MAC SDUs)
  Scheduling information reporting
  HARQ (Error correction through HARQ)
  Priority handling between logical channels (Priority handling between logical channels of one UE)
  Priority handling between UEs (Priority handling between UEs by means of dynamic scheduling)
  MBMS service identification
  Transport format selection
  Padding An NR physical (PHY) layer 4-20 or 4-25 may perform channel coding and modulation on upper layer data to make the data into an OFDM symbol and transmit the OFDM symbol through a wireless channel, or may perform demodulation and channel-decoding on an OFDM symbol received through a wireless channel, and then transfer the OFDM symbol to an upper layer.

The disclosure proposes a process in which when a terminal (or a transmission node) transmits data through uplink in a wireless communication system, the terminal compresses the data and a base station (or a reception node) decompresses the data. In addition, the disclosure proposes a method for supporting a data transmission/reception process in which a transmission node compresses data and a reception node decompresses the data, the method including a specific header format and a solution of decompression failure. In addition, a method proposed in the disclosure may be also applied to a process in which when a base station (or a transmission node) transmits downlink data to a terminal (or a reception node), the base station compresses and transmits the data and the terminal receives and decompresses the compressed downlink data. As described above, in the disclosure, a transmission node compresses and transmits data, and thus can transmit more data and improve the coverage at the same time.

Figure 5:
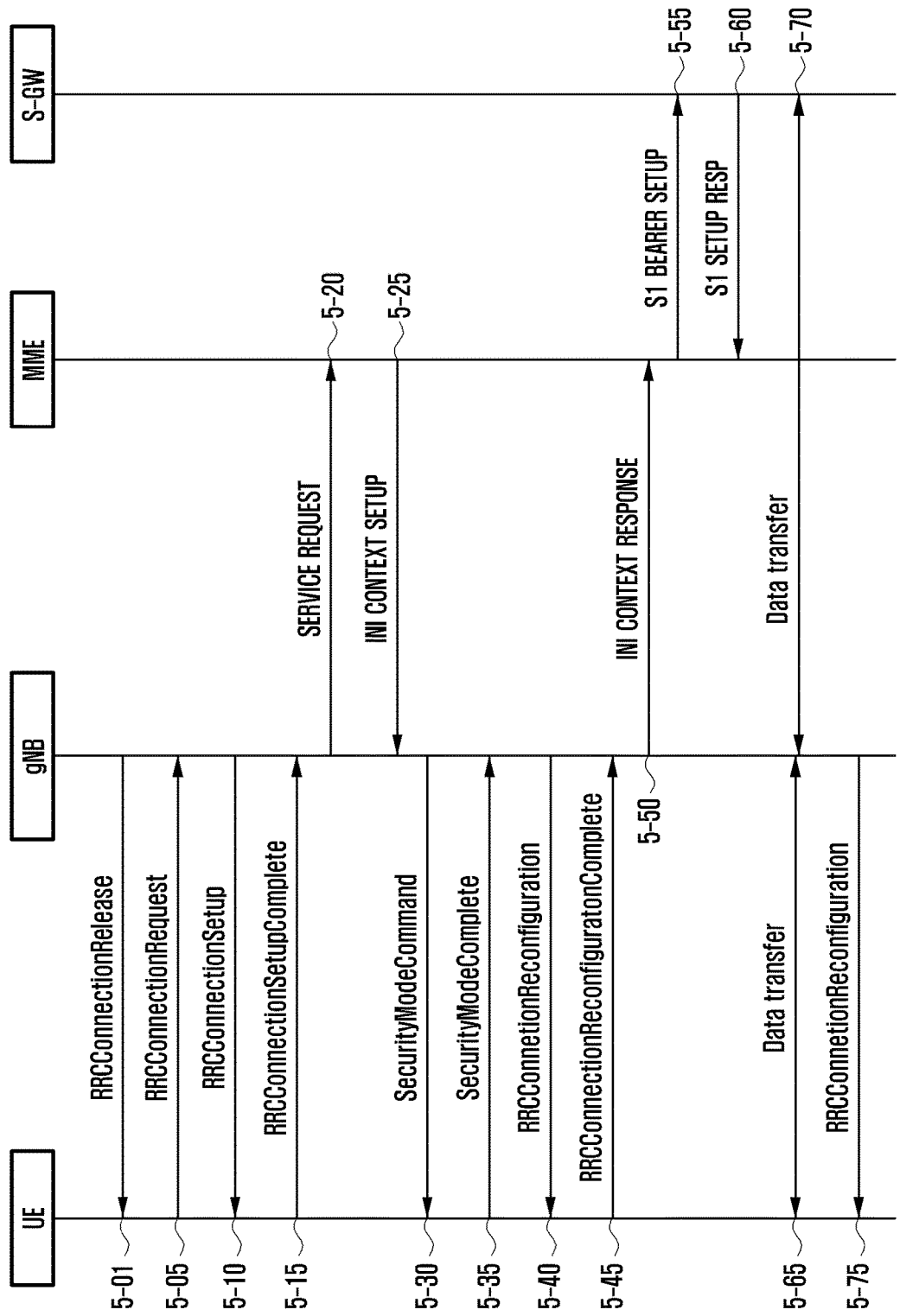
FIG. 5 is a diagram illustrating a process of configuring whether a base station is to perform uplink data compression, when a terminal configures a connection with a network according to an embodiment of the disclosure.

FIG. 5 is a diagram illustrating a process of configuring whether a base station is to perform uplink data compression, when a terminal configures a connection with a network according to an embodiment of the disclosure.

FIG. 5 illustrates a process in which a terminal switches a radio resource control (RRC) idle mode or an RRC inactive mode (or lightly-connected mode) to an RRC connected mode and configures a connection with a network, and illustrates a process in the terminal configures whether to perform uplink data compression (UDC), in the disclosure.

Referring to FIG. 5, if a terminal that transmits or receives data in an RRC connected mode does not perform transmission or reception of data due to a predetermined reason or during a predetermined time interval, a base station may transmit an RRCConnectionRelease message to the terminal to allow the terminal to be switched to an RRC idle mode (operation 5-01). In the future, the terminal (hereinafter, idle mode UE) in which a current connection is not configured performs an RRC connection establishment procedure with the base station if data to be transmitted occurs. The terminal establishes reverse transmission synchronization with the base station through a random access procedure and transmits an RRCConnectionRequest message to the base station (operation 5-05). The message contains an identifier of the terminal and a cause (establishmentCause) of connection configuration.

The base station transmits an RRCConnectionSetup message to the terminal so that the terminal configures an RRC connection (operation 5-10). The message may include information indicating whether to use an uplink data compression method (UDC) or whether to use a downlink data compression method for each logical channel (logicalchannelconfig), each bearer, or each PDCP device (PDCP-config). In addition, the message may more specifically indicate only a IP flow or a QoS flow for which an uplink data compression method (UDC) is to be used in each logical channel, each bearer, or each PDCP device (or service data adaptation protocol (SDAP) device) (e.g., the message may configure, for an SDAP device, information relating to an IP flow or a QoS flow for which an uplink data compression method is used or not used, so that the SDAP device may indicate, to a PDCP device, whether to use an uplink data compression method for each QoS flow. Otherwise, a PDCP device may identify each QoS flow by itself and determine whether to apply an uplink compression method).

In addition, in the above description, if use of an uplink data compression method is indicated, the message may indicate a predefined library to be used in the uplink data compression method, an identifier of dictionary information (Dictionary), or a buffer size to be used in the uplink data compression method. In addition, the message may include a command which sets up or releases performing of uplink decompression. In addition, in the above description, when use of an uplink data compression method is configured, an RLC AM bearer (a mode in which there are an ARQ function and a retransmission function and thus there is no loss) may be configured every time, and a header compression protocol (ROHC) may not be configured together.

In addition, the message contains RRC connection configuration information. An RRC connection is also called a signaling radio bearer (SRB), and is used for transmission and reception of an RRC message that is a control message between the terminal and the base station. The terminal having configured the RRC connection transmits an RRC-ConnetionSetupComplete message to the base station (operation 5-15). If the base station does not know terminal capability of the terminal configuring the current connection or desires to identify the terminal capability, the base station may transmit a message asking the capability of the terminal. The terminal may transmit a message reporting terminal capability. The message of the terminal reporting the terminal capability may indicate whether the terminal can use an uplink data compression method (UDC) or a downlink data compression method, and may be transmitted with an indicator indicating same.

The RRCConnetionSetupComplete message includes a control message, called SERVICE REQUEST, through which the terminal requests bearer configuration for a predetermined service from an MME. The base station transmits the SERVICE REQUEST message contained in the RRCConnetionSetupComplete message to the MME (operation 5-20), and the MME determines whether to provide the service requested by the terminal. If a result of the determination shows that the MME has decided to provide the service requested by the terminal, the MME transmits an INITIAL CONTEXT SETUP REQUEST message to the base station (operation 5-25). The message includes information such as quality-of-service (QoS) information to be applied at the time of configuration of a data radio bearer (DRB), and security-related information (e.g., Security Key, Security Algorithm) to be applied to the DRB.

The base station exchanges a SecurityModeCommand message (operation 5-30) and a SecurityModeComplete message (5-35) in order to configure security with the terminal. If the configuring of the security is completed, the base station transmits an RRCConnectionReconfiguration message to the terminal (operation 5-40). The message may include information indicating whether to use an uplink data compression method (UDC) or whether to use a downlink data compression method for each logical channel (logicalchannelconfig), each bearer, or each PDCP device (PDCP-config). In addition, the message may more specifically indicate only a IP flow or a QoS flow for which an uplink data compression method (UDC) is to be used in each logical channel, each bearer, or each PDCP device (or SDAP device) (e.g., the message may configure, for an SDAP device, information relating to an IP flow or a QoS flow for which an uplink data compression method is used or not used, so that the SDAP device may indicate, to a PDCP device, whether to use an uplink data compression method for each QoS flow. Otherwise, a PDCP device may identify each QoS flow by itself and determine whether to apply an uplink compression method).

In addition, in the above description, if use of an uplink data compression method is indicated, the message may indicate a predefined library to be used in the uplink data compression method, an identifier of dictionary information (Dictionary), or a buffer size to be used in the uplink data compression method. In addition, the message may include a command which sets up or releases performing of uplink decompression. In addition, in the above description, when use of an uplink data compression method is configured, an RLC AM bearer (a mode in which there are an ARQ function and a retransmission function and thus there is no loss) may be configured every time, and a header compression protocol (ROHC) may not be configured together.

In addition, the message includes configuration information of a DRB through which user data is processed, and the terminal configures the DRB by applying the information and transmits an RRCConnectionReconfigurationComplete message to the base station (operation 5-45). The base station having completed the configuring of the DRB with the terminal transmits an INITIAL CONTEXT SETUP COMPLETE message to the MME (operation 5-50), and the MME having received the message exchanges an S1 BEARER SETUP message and an S1 BEARER SETUP RESPONSE message in order to configure a S1 bearer with an S-GW (operations 5-55 and 5-60). The S1 bearer is a data transmission connection configured between the S-GW and the base station and corresponds to the DRB in one-to-one correspondence. If all the procedures are completed, the terminal transmits or receives data to or from the base station through the S-GW (operations 5-65 and 5-70).

As described above, a general data transmission procedure generally includes three stages of RRC connection configuration, security configuration, and DRB configuration. In addition, the base station may transmit an RRCConnectionReconfiguration message to newly establish a configuration, add a configuration, or change a configuration for the terminal due to a predetermined reason (operation 5-75). The message may include information indicating whether to use an uplink data compression method (UDC) or whether to use a downlink data compression method for each logical channel (logicalchannelconfig), each bearer, or each PDCP device (PDCP-config). In addition, the message may more specifically indicate only a IP flow or a QoS flow for which an uplink data compression method (UDC) is to be used in each logical channel, each bearer, or each PDCP device (or service data adaptation protocol (SDAP) device) (e.g., the message may configure, for an SDAP device, information relating to an IP flow or a QoS flow for which an uplink data compression method is used or not used, so that the SDAP device may indicate, to a PDCP device, whether to use an uplink data compression method for each QoS flow. Otherwise, a PDCP device may identify each QoS flow by itself and determine whether to apply an uplink compression method).

In addition, in the above description, if use of an uplink data compression method is indicated, a predefined library to be used in the uplink data compression method, an identifier of dictionary information (Dictionary), or a buffer size to be used in the uplink data compression method may be indicated. In addition, the message may include a command which sets up or releases performing of uplink decompression. In addition, in the above description, when use of an uplink data compression method is configured, an RLC AM bearer (a mode in which there are an ARQ function and a retransmission function and thus there is no loss) may be configured every time, and a header compression protocol (ROHC) may not be configured together.

Figure 6:
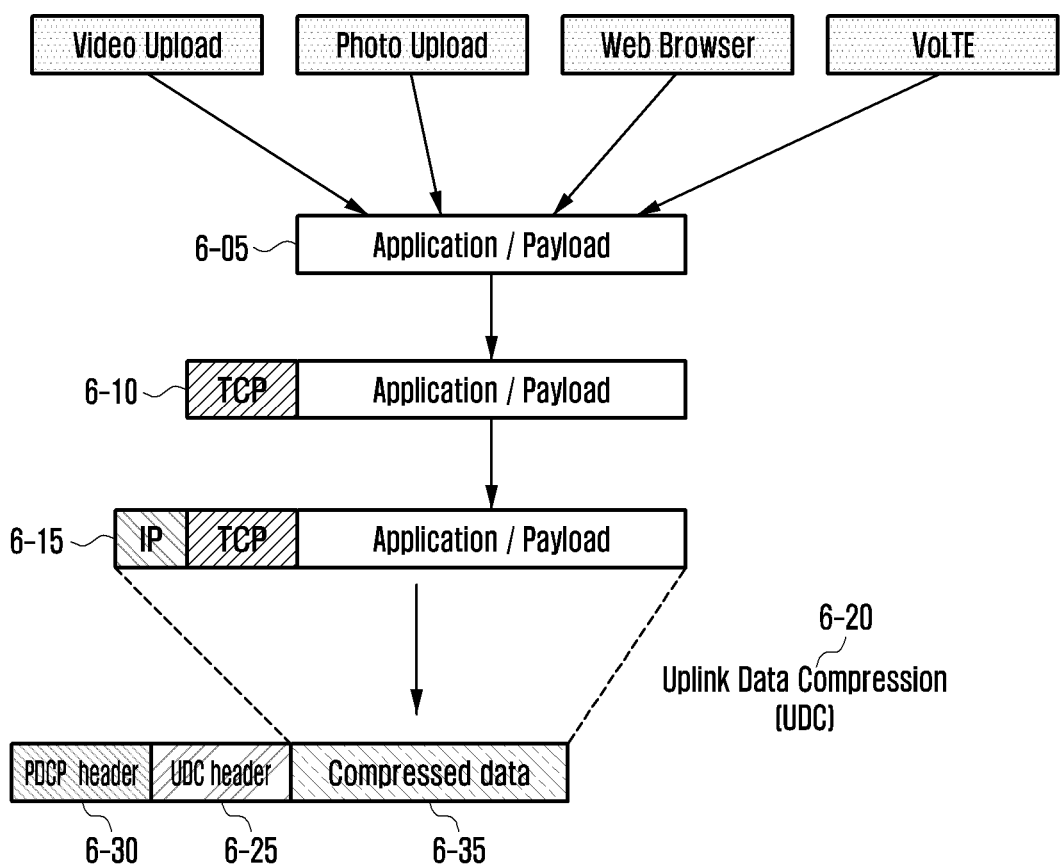
FIG. 6 is a diagram illustrating a data configuration and a process of performing uplink data compression according to an embodiment of the disclosure.

FIG. 6 is a diagram illustrating a data configuration and a process of performing uplink or downlink data compression according to an embodiment of the disclosure. The following description will be based on uplink data for convenience of explanation, but may be applied to downlink data in the same way.

Referring to FIG. 6, uplink data 6-05 may be generated to be data corresponding to services such as video transmission, photo transmission, Web search, and VoLTE. Pieces of data generated in an application layer device may be processed through a user datagram protocol (UDP) or a transmission control protocol/Internet protocol (TCP/IP) corresponding to a network data transmission layer, may configure individual headers 6-10 and 6-15, and may be transferred to a PDCP layer. The PDCP layer may perform the following process if the PDCP layer receives data (PDCP SDU) from an upper layer.

If an uplink data compression method is configured to be used in the PDCP layer by an RRC message, for example, in operation 5-10, 5-40, or 5-75 in FIG. 5, the PDCP layer may compress uplink data by performing an uplink data compression (UDC) method on a PDCP SDU, for example, in operation 6-20; configure a UDC header (header 6-25 for compressed uplink data) corresponding to the compressed data; encode (ciphering) the compressed data 6-35 excluding the UDC header; perform integrity protection if the integrity protection is configured; and configure a PDCP header 6-30 to configure a PDCP PDU. In the above description, a PDCP layer device includes a UDC compression/decompression device, determines whether to perform a UDC process on each data, according to the configuration of the RRC message, and uses the UDC compression/decompression device. In a transmission node, a transmission PDCP layer device performs data compression by using a UDC compression device, and in a reception node, a reception PDCP layer device performs data decompression by using a UDC decompression device.

The processes in FIG. 6 described above may be also applied to compression of downlink data by a base station, as well as compression of uplink data by a terminal. In addition, the above description about uplink data may be also applied to downlink data in the same way.

Figure 7:
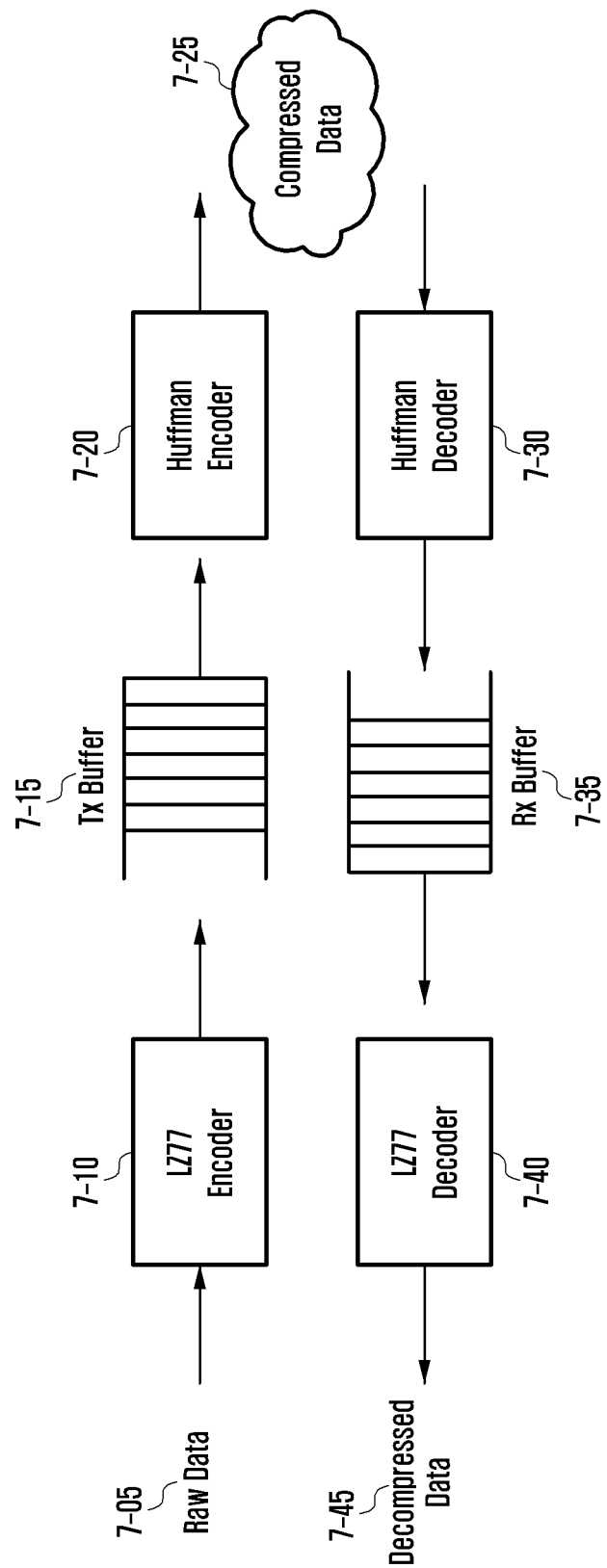
FIG. 7 is a diagram illustrating an embodiment of an uplink data compression method which may be applied according to an embodiment of the disclosure.

FIG. 7 is a diagram illustrating an embodiment of an uplink data compression method which may be applied in the disclosure according to an embodiment of the disclosure.

Referring to FIG. 7, a diagram of an uplink data compression algorithm based on DEFLATE, and an uplink data compression algorithm based on DEFLATE is a lossless compression algorithm is illustrated. The DEFLATE-based uplink data compression algorithm basically combines a LZ77 algorithm and Huffman coding to compress uplink data. The LZ77 algorithm performs an operation of scanning an overlapping arrangement of data, wherein the scanning of the overlapping arrangement is performed in a sliding window through the sliding window; and if the overlapping arrangement is discovered, expresses the position of the overlapping arrangement and the length of the overlapping amount in the sliding window, to perform data compression. The sliding window is also called a buffer in an uplink data compression (UDC) method, and may be configured to have 8 kilobytes or 32 kilobytes. That is, the sliding window or a buffer may record 8192 or 32768 characters, scan overlapping arrangements, and express same by using the length and the position to perform compression.

Therefore, the LZ algorithm corresponds to a sliding window scheme, and thus previously coded pieces of data are updated in a buffer, and immediately subsequent pieces of data are coded again. Therefore, consecutive pieces of data are correlated. Therefore, only if previously coded pieces of data are decoded normally, it is possible to normally decode subsequent pieces of data. In the above description, codes (expression such as position and length) compressed by being expressed through the LZ77 algorithm by the position and length are compressed through Huffman coding once more. The Huffman coding scans overlapping codes again and compress the codes once more by using a short mark for a code overlapped many times and using a long mark for a code less overlapped. The Huffman coding corresponds to prefix coding, and an optimal coding scheme having a characteristic (uniquely decodable) in which all the codes are clearly distinguished from each other.

As described above, a transmission node may encode raw data 7-05 by applying a LZ77 algorithm to same (operation 7-10), update a buffer (operation 7-15), and generate checksum bits of contents (or data) of the buffer to configure the bits for a UDC header. The checksum bits are used for a reception node to determine whether the state of the buffer is valid. Codes encoded through the LZ77 algorithm may be compressed through Huffman (operation 7-20) coding once more and then be transmitted through uplink data (operation 7-25). The reception node performs a decompression process on the received compressed data contrary to the transmission node. That is, the reception node performs Huffman decoding (operation 7-30), updates a buffer (operation 7-35), and identifies whether the updated buffer is valid, through the checksum bits of the UDC header. If it is determined that there are no errors in the checksum bits, the reception node may perform decoding through a LZ77 algorithm (operation 7-40) to decompress data and reconstruct the raw data, and transfer the reconstructed data to an upper layer (operation 7-45).

As described above, the LZ algorithm corresponds to a sliding window scheme, that is, previously coded pieces of data are updated in a buffer, and immediately subsequent pieces of data are coded again. Therefore, consecutive pieces of data are correlated. Therefore, only if previously coded pieces of data are decoded normally, it is possible to normally decode subsequent pieces of data. Therefore, a reception PDCP layer device identifies a PDCP sequence number of a PDCP header and identifies (identifies an indicator indicating whether data compression has been performed or not) a UDC header and performs a data decompression process on pieces of data to which a data compression process has been applied, according to an ascending order based on the PDCP sequence numbers.

A process in which a base station performs uplink data compression (UDC) configuration to a terminal, and a process in a terminal performs uplink data compression (UDC), proposed in the disclosure are given as follows. In addition, in the following description, UDC implies an uplink data compression procedure of a terminal, but may be also applied to a downlink data compression procedure of a base station for the same purpose. Particularly, although the meaning of the term UDC includes uplink, a compression procedure according to UDC can be also applied to downlink. Plenty of different terms may be applied to downlink instead of the term UDC.

A base station may configure or release, for a terminal, performing of uplink data compression on a bearer or a logical channel in which an RLC AM mode is configured, by an RRC message, for example, in operation 5-10, 5-40, or 5-75 in FIG. 5. In addition, the base station may reset a UDC device (or protocol) of a PDCP layer device of the terminal by using the RRC message. The resetting of the UDC device (or protocol) implies resetting of a UDC buffer for uplink data compression of the terminal, and is performed to synchronize a UDC buffer of the terminal with a UDC buffer for uplink data decompression of the base station. The resetting of a buffer of the UDC device may define a new PDCP control PDU so that the PDCP control PDU may be used instead of the RRC message to a transmission node (base station) to reset a UDC buffer of a reception node (terminal) and perform synchronization for user data compression/decompression between the transmission node and the reception node. In addition, the base station may configure whether uplink data compression is performed, for each bearer, each logical channel, or each PDCP layer device by using the RRC message. More specifically, the base station may configure whether uplink data decompression is to be performed, for each IP flow (or QoS flow) in a bearer, a logical channel, or a PDCP layer device.

In addition, the base station may configure a PDCP discard timer value for the terminal by the RRC message. As the PDCP discard timer value, a PDCP discard timer value for data for which uplink data compression is not performed, and a PDCP discard timer value for data to which uplink data compression is applied may be configured separately.

If the terminal is configured to perform uplink data compression on a predetermined bearer, logical channel, or PDCP layer device (or some QoS flows of a predetermined bearer, logical channel, or PDCP layer device) by the RRC message, the terminal resets a buffer in a UDC device of a PDCP layer device according to the configuration, and prepares an uplink data compression process. After the preparation, if the terminal receives data (i.e., PDCP SDU) from an upper layer and is configured to perform uplink data compression on the PDCP layer device, the terminal performs uplink data compression on the received data. If the terminal is configured to perform uplink data compression on only particular QoS flows of the PDCP layer device, the terminal identifies a QoS flow identifier or an indication of an upper SDAP layer to determine whether to perform uplink data compression and then performs uplink data compression. If the terminal performs uplink data compression (UDC) and updates a buffer according to the data compression, the terminal configures a UDC buffer.

In the above description, if the terminal performs uplink data compression (UDC), the terminal may compress a PDCP SDU received from an upper layer to be UDC compression data (UDC block) having a smaller size. The terminal configures a UDC header relating to compressed UDC compression data. The UDC header may include an indicator indicating whether uplink data compression has been performed or not (e.g., if a one-bit indicator of the UDC header is 0, this implies UDC has been applied, and if the indicator is 1, this implies UDC has been unapplied).

In the above description, a case where the terminal does not apply uplink data compression may include a case where data compression is unable to be performed by the above described UDC compression method (DEFLATE algorithm) since a PDCP SDU data structure received from an upper layer is not a repetitive data structure. In the above description, if the terminal performs uplink data compression (UDC) on data (PDCP SDU) received from an upper layer and updates a UDC buffer, the terminal may calculate checksum bits and include same in the UDC buffer in order to allow a reception PDCP layer device to check the validity of the updated UDC buffer (the checksum bits have a predetermined length, and may be configured by 4 bits, for example).

A transmission PDCP layer device (i.e., terminal) may initialize a transmission UDC buffer; and define and configure one bit in a UDC header of first data to which UDC compression is newly applied after the initialization of the transmission UDC buffer, to instruct a reception PDCP layer device to initialize a reception UDC buffer and newly start UDC decompression on the data for which the UDC header is configured, first, to the initialized reception UDC buffer. For example, a transmission PDCP layer device (i.e., terminal) may define a FR field as indicated by reference numeral 9-05 in FIG. 9, and give an indication through the FR field. In addition, whether a transmission PDCP layer device in which a UDC compression process is configured as described above has applied the UDC compression process to data received from an upper layer may be defined by one bit, for example, an FU field 9-10 in FIG. 9, of the UDC header 9-02 in FIG. 9, and may be indicated through the field.

The terminal encodes (ciphering) data to which uplink data decompression has been applied or not as described above, performs integrity protection if the integrity protection is configured, and then transfers the data to a lower layer.

Figure 8:
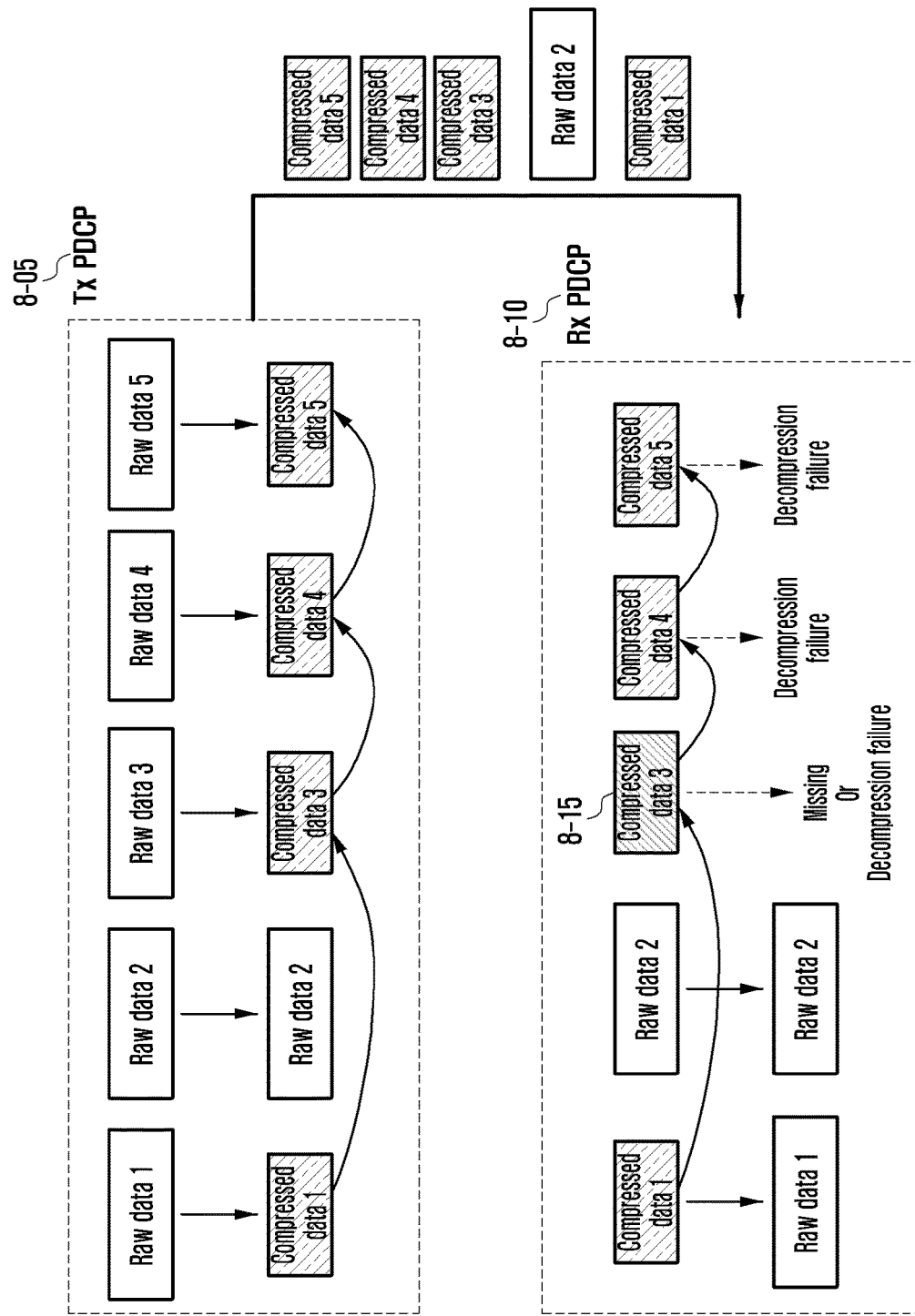
FIG. 8 is a diagram illustrating a problem in which a decompression failure occurs in an uplink data compression method according to an embodiment of the disclosure.

FIG. 8 is a diagram illustrating a problem in which a decompression failure occurs in an uplink or downlink data compression method according to an embodiment of the disclosure.

Referring to FIG. 8, as described above with reference with FIG. 7, an algorithm (DEFLATE algorithm (performing of Huffman coding after LZ77 algorithm is performed) performing uplink data compression (UDC) is a scheme in which when a transmission node performs data compression, the transmission node updates previously compressed data in a buffer, compares the data with data to be compressed next, based on the buffer, scans a repetitive structure, and compresses the structure by position and length.

Therefore, only if a reception node performs decompression in an order in which the transmission has performed compression, the decompression may succeed. For example, in a case where the transmission node performs UDC compression on pieces of data having PDCP sequence numbers 1, 3, 4, and 5, and does not perform UDC compression on data having PDCP sequence number 2 (as indicated by reference numeral 8-05), the reception node is also required to perform decompression on received data in a PDCP layer device in an order of PDCP sequence numbers 1, 3, 4, and 5, to successfully perform the decompression.

If the transmission node performs UDC compression as described above, this performing is indicated by a UDC header, and thus the reception node may also determine whether UDC compression is applied, by identifying the UDC header. If data 8-15 corresponding to PDCP sequence number 3 is lost in a procedure of performing a series of UDC decompression as described above, UDC decompression of data after the data is failed all. That is, UDC decompression is unable to be performed on pieces of data having PDCP sequence numbers 4 and 5 (as indicated by reference numeral 8-10).

Therefore, there should be no lost data (packet) in an uplink decompression process, and the reception node is required to perform decompression in an order in which the transmission node has performed UDC compression on data. Therefore, an RLC AM mode in which there is no loss and there is a retransmission function is required to be operated.

However, loss data described above may be incurred by a PDCP discard timer of the PDCP layer device. That is, the PDCP layer device drives a timer with a PDCP discard timer value configured by the RRC message for each data (packet or PDCP SDU) received from an upper layer. If the timer is expired, the PDCP layer device discards data corresponding to the timer. Therefore, if a timer of data to which UDC compression has been performed is expired, the data may be discarded, and thus the reception node may fail to perform UDC decompression on pieces of UDC-compressed data after the data.

As described with reference to FIG. 7 of the disclosure, according to an algorithm (DEFLATE algorithm (performing of Huffman coding after LZ77 algorithm is performed)) performing uplink data compression (UDC), when a transmission node performs uplink data compression, uplink data compression is performed, and then the transmission node generates checksum by using current buffer contents and configures the checksum in a UDC buffer. The transmission node updates the buffer by using raw data of compressed data, compares the raw data with data to be compressed next, based on the buffer, scans a repetitive structure, and compresses the structure by the position and length.

Checksum bits in a UDC header is configured to determine the validity of a current state of the buffer before a UDC device (or function) of a reception PDCP layer device performs data decompression. That is, before the reception node performs data decompression, the reception node identifies the validity of a current reception node UDC buffer through checksum bits in a UDC header. If there are no checksum errors, the reception node performs data decompression and if there occurs a checksum failure, the reception node does not perform data decompression and is required to report the checksum failure to the transmission node and recover from the failure.

Even when the reception node performs decompression, only if the reception node performs decompression in an order in which the transmission has performed compression, the decompression may succeed. For example, in a case where the transmission node performs UDC compression on pieces of data having PDCP sequence numbers 1, 3, 4, and 5, and does not perform UDC compression on data having PDCP sequence number 2, the reception node is also required to perform decompression on received data in a PDCP layer device in an order of PDCP sequence numbers 1, 3, 4, and 5, to successfully perform the decompression. If the transmission node performs UDC compression as described above, this performing is indicated by a UDC header, and thus the reception node may also determine whether UDC compression is applied, by identifying the UDC header. If a checksum failure has occurred at PDCP sequence number 3 in a procedure of performing a series of UDC decompression as described above, UDC decompression after the failure may be failed all. That is, UDC decompression is unable to be successfully performed on pieces of data having PDCP sequence numbers 4 and 5.

In the following description, the disclosure proposes a checksum failure processing method for solving a checksum failure problem described above.

Figure 9:
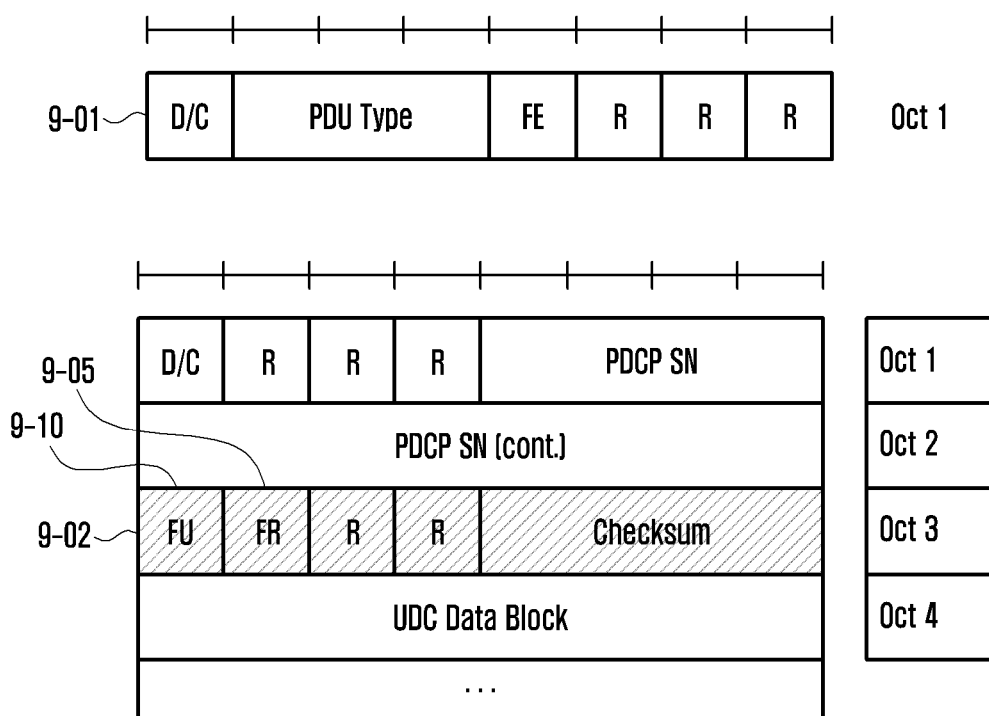
FIG. 9 illustrates a PDCP control PDU format which may be applied in a checksum failure processing method according to an embodiment of the disclosure.

FIG. 9 illustrates a PDCP control PDU format which may be applied in a checksum failure processing method of the disclosure according to an embodiment of the disclosure.

Referring to FIG. 9, a D/C field is used to distinguish between normal data or PDCP layer control information (PDCP control PDU) in a PDCP layer, and a PDU Type field is used to indicate a type of information among pieces of PDCP layer control information described above (see table 1 below). A one-bit indicator (e.g., FE field) indicating whether a checksum failure has occurred or not may be defined and used as a PDCP control PDU format for feedback in a checksum failure processing method proposed in the disclosure, as illustrated by reference numeral 9-01. If the value of the one-bit indicator is 0, this may indicate that UDC decompression is being performed normally. If the value of the one-bit indicator is 1, this may indicate that a checksum failure has occurred during UDC decompression, and indicating initializing (resetting) of a UDC buffer of a transmission PDCP layer device.

In order to define a format 9-01, reserved values (e.g., 011 or a random reserved value between 100 and 111) may be assigned to a PDU type to define a new PDCP control PDU, and a PDCP control PDU having the defined PDU type may serve as a feedback indicating a checksum failure.

TABLE 1

| Bit | Description |
| --- | --- |
| 000 | PDCP status report |
| 001 | Interspersed ROHC feedback packet |
| 010 | LWA status report |
| 011 | UDC checksum failure feedback |
| 100-111 | Reserved |

An embodiment proposed in the disclosure, relating to a checksum failure processing method to which a PDCP control PDU proposed in FIG. 9 is applied, is given as follows.

If a reception node (base station) identifies a checksum failure of a reception UDC buffer for data to which uplink data compression (UDC) is to be released, the reception node transmits a PDCP control PDU to a terminal to indicate that a checksum failure has occurred. As the PDCP control PDU, a new PDCP control PDU may be defined and used, and a new indicator may be defined and then included in an existing PDCP control PDU, whereby the existing PDCP control PDU may be modified and used. In another method, an indicator resetting a UDC buffer since a checksum failure has occurred may be defined instead of a PDCP sequence number and may indicate the reset.

Operation of reception node: If a checksum failure has occurred, the reception node may initialize the UDC buffer immediately. The reception node rearranges newly received pieces of data according to PDCP sequence numbers, and then identifies a UDC header of each piece of data in an ascending order of the PDCP sequence numbers. The reception node has received an indicator showing that a transmission node UDC buffer has been reset due to a UDC checksum failure, and thus the reception node discards pieces of data which do not include an indication initializing the reception UDC buffer and are indicated such that UDC compression has been performed. In addition, if all the pieces of data, among newly received pieces of data, which do not include, in each UDC header, an indicator showing that the transmission node UDC buffer has been reset due to a UDC checksum failure, and are indicated such that UDC compression has not been performed, have been received without a gap according to an order based on PDCP sequence numbers, the reception node may process the pieces of data in an ascending order of the PDCP sequence numbers and then transfer same to an upper layer device. The reception node may initialize the reception UDC buffer from pieces of data which include, in each UDC header, an indicator resetting the reception UDC buffer and indicating that the transmission node UDC buffer has been reset due to a UDC checksum failure, and may restart decompression on UDC-compressed pieces of data in the ascending order of the PDCP sequence numbers.

Operation of transmission node A transmission node (terminal) may reset (initialize) a UDC transmission buffer if the PDCP control PDU is received; if there are pieces of data (e.g., PDCP PDU), among pieces of data generated through a UDC compression process, which have not been transmitted yet, discard the pieces of data before the initialization of the UDC transmission buffer; perform uplink data compression (UDC) again on pieces of raw data (e.g., PDCP SDU) of the pieces of data which have not been transmitted yet, based on the initialized transmission UDC buffer; update the UDC buffer; include checksum bits in a UDC header; encode the UDC header and data part; generate a PDCP header; and configure a PDCP PDU to transfer same to a lower layer. In addition, the transmission node may transfer the UDC header or the PDCP header of the newly configured PDCP PDU after including an indicator showing that the transmission node buffer has been reset and an indication initializing the reception node buffer, and may newly assign PDCP sequence numbers which have not been transmitted yet, in an ascending order (That is, if data which has been encoded with a PDCP sequence number, a HFN, or a COUNT value and a security key and has been transmitted is encoded again with the same PDCP COUNT value and the security key and is then retransmitted, the risk of hacking increases, and thus a rule in which one PDCP COUNT value allows one time of encoding and transmission may be followed). In another method, the transmission node may reset the transmission UDC buffer when an indication showing that a checksum failure has occurred is received; newly perform UDC compression only a PDCP PDU to be newly configured, or data having a PDCP sequence number larger than or equal to that of data which has not been transmitted yet to the lower layer from the transmission node; and transfer the compressed data or PDCP PDU to the lower layer. In addition, the transmission node may transfer a UDC header or a PDCP header of the newly configured PDCP PDU after including an indicator showing that the transmission node UDC buffer has been reset (or an indicator initializing the reception node buffer)(That is, if data which has been encoded with a PDCP COUNT value and a security key and has been transmitted is encoded again with the same PDCP COUNT value and the security key and is then retransmitted, the risk of hacking increases, and thus a rule in which one PDCP COUNT value allows one time of encoding and transmission may be followed).

However, a checksum failure described above may be incurred by a PDCP discard timer of a PDCP layer device. That is, a PDCP layer device drives a timer with a PDCP discard timer value configured by the RRC message for each data (packet or PDCP SDU) received from an upper layer. If the timer is expired, the PDCP layer device discards data corresponding to the timer. Therefore, if a timer of pieces of data to which UDC compression has been performed is expired, a part of the pieces of UDC-compressed data may be discarded, and thus the reception node may fail to perform UDC decompression on pieces of UDC-compressed data after the discarded part of data.

In the following description, the disclosure proposes the (1-1)th embodiment for, when a transmission PDCP layer device discards data to which UDC compression has been performed, by a PDCP discard timer, preventing data loss and reducing pieces of data in which a checksum failure occurs, in a reception node.

Operation of transmission node: in a case where an uplink data compression process is configured in a transmission PDCP layer device, if data which has not been transmitted yet and has been UDC-compressed is discarded by expiration of a PDCP discard timer, a transmission node may transmit data which has a PDCP sequence number larger than that of the discarded data and has been UDC-compressed; discard all the pieces of remaining data (pieces of data, for example, PDCP PDUs, each of which have a PDCP sequence number larger than that next to the discarded data, to which user data compression has been applied, and which have not been transmitted yet and have been stored); and transmit, to a lower layer device, an indicator discarding the pieces of data if the pieces of data have been transferred already to the lower layer device. The transmission node may stop data transmission with respect to the transmission PDCP layer device until a PDCP control PDU indicating that a checksum failure has occurred is received. This is because an intermediate piece or a part of the pieces of UDC-compressed data has been discarded, and thus user data compression is performed previously, and it is obvious that a checksum failure relating to pieces of data (e.g., PDCP PDU) each having a PDCP sequence number larger than that of the discarded piece of data will occur in a reception PDCP layer device. Therefore, the transmission node may expect that if the transmission node transmits data corresponding to a PDCP sequence number next to the discarded data, the reception PDCP layer device identifies a checksum failure and transmits a PDCP control PDU to the transmission node.

Therefore, if the transmission PDCP layer device has received a PDCP control PDU indicating that a checksum failure has occurred, or before the PDCP control PDU is received, the transmission PDCP layer device initializes a transmission buffer for user data compression (if the transmission UDC buffer is initialized previously, the transmission PDCP layer device does not initialize the transmission buffer for user data compression) and is required to apply the user data compression process again first on pieces of raw data (e.g., PDCP SDU) of pieces of data, of which a PDCP discard timer has not yet expired and which have not been transmitted yet, or raw data (e.g., PDCP SDU) of data (data corresponding to a PDCP sequence number next to discarded data and thus having been transmitted), of which a PDCP discard timer has not yet expired and which has been transmitted lastly. In this case, the transmission PDCP layer may apply the user data compression process and assign numbers from a new PDCP sequence number or a first PDCP sequence number which has not been transmitted yet, in an ascending order to encode, generate, and prepare data (e.g., PDCP PDU). The transmission PDCP layer device may restart transmission of the newly generated and prepared pieces of data (e.g., PDCP PDU) after the PDCP control PDU indicating that the checksum failure has occurred is received. That is, the transmission PDCP layer device may transfer data to a lower layer device.

In another method, when the transmission PDCP layer device may newly apply user data compression, based on raw data (e.g., PDCP SDU) of a piece of discarded data (e.g., PDCP PDU) and apply integrity protection or an encoding process to newly generate pieces of data (e.g., PDCP PDU), the transmission PDCP layer device may assign the newly generated pieces of data (e.g., PDCP PDU) with numbers from a PDCP sequence number or a COUNT value next to a PDCP sequence number or a COUNT value of data (e.g., PDCP PDU) transferred to the lower layer lastly or transmitted lastly. As described above, if the transmission PDCP layer device may assign the newly generated pieces of data (e.g., PDCP PDU) with numbers from a PDCP sequence number or a COUNT value next to a PDCP sequence number or a COUNT value of data (e.g., PDCP PDU) transferred to the lower layer lastly or transmitted lastly, the occurrence of a PDCP sequence number gap is prevented so as to prevent transmission delay which is incurred by a PDCP rearrangement timer triggered by the reception PDCP layer device.

In the disclosure, a PDCP SDU may indicate raw data received by the transmission PDCP layer device from an upper layer device, and a PDCP PDU may indicate data which the transmission PDCP layer device is to transmit to a lower layer device after completing data processing. The data processing may include processing such as integrity protection and verification, header compression, user layer data compression, or an encoding process, which are configured in a PDCP layer device. In addition, a PDCP PDU generated through data processing of the PDCP SDU may be separate data different from the PDCP SDU; even if the PDCP PDU is discarded, the PDCP SDU may be stored, and a PDCP SDU may be discarded only by a PDCP data discard timer.

Therefore, in a case where a user data compression process is configured, if a part of pieces of data which has been previously generated and to which user data compression has been applied is discarded by a PDCP discard timer, a checksum failure which may occur in pieces of data each having a PDCP sequence number larger than that of the discarded part of data may be reduced, and data may be generated again from pieces of data which have not been transmitted yet or lastly transmitted data (data corresponding to a PDCP sequence number next to discarded data and thus having been transmitted), so as to prevent data loss.

If a reception node (base station) identifies a checksum failure of a reception UDC buffer for data to which uplink data compression (UDC) is to be released, the reception node transmits a PDCP control PDU to a terminal to indicate that a checksum failure has occurred. As the PDCP control PDU, a new PDCP control PDU may be defined and used, and a new indicator may be defined and then included in an existing PDCP control PDU, whereby the existing PDCP control PDU may be modified and used. In another method, an indicator resetting a UDC buffer since a checksum failure has occurred may be defined instead of a PDCP sequence number and may indicate the reset.

Operation of reception node: If a checksum failure has occurred, the reception node may initialize the UDC buffer immediately. The reception node rearranges newly received pieces of data according to PDCP sequence numbers, and then identifies a UDC header of each piece of data in an ascending order of the PDCP sequence numbers. The reception node has received an indicator showing that a transmission node UDC buffer has been reset due to a UDC checksum failure, and thus the reception node discards pieces of data which do not include an indication initializing the reception UDC buffer and are indicated such that UDC compression has been performed. In addition, if all the pieces of data, among newly received pieces of data, which do not include, in each UDC header, an indicator showing that the transmission node UDC buffer has been reset due to a UDC checksum failure, and are indicated such that UDC compression has not been performed, have been received without a gap according to an order based on PDCP sequence numbers, the reception node may process the pieces of data in an ascending order of the PDCP sequence numbers and then transfer same to an upper layer device. The reception node may initialize the reception UDC buffer from pieces of data which include, in each UDC header, an indicator resetting the reception UDC buffer and indicating that the transmission node UDC buffer has been reset due to a UDC checksum failure, and may restart decompression on UDC-compressed pieces of data in the ascending order of the PDCP sequence numbers.

In the following description, the disclosure proposes the (1-2)th embodiment for, when a transmission PDCP layer device discards data to which UDC compression has been performed, by a PDCP discard timer, preventing data loss and reducing pieces of data in which a checksum failure occurs, in a reception node.

In order to solve the problem, in the (1-2)th embodiment, if a transmission PDCP layer device in which a UDC compression process is configured discards first data to which UDC compression has been applied and which has not been transmitted yet, by expiration of a PDCP discard timer, the transmission PDCP layer device may discard the first data and discard all the pieces of second data (e.g., PDCP PDUs) each of which has a PDCP sequence number larger than that of the discard first data and has not been transmitted yet, and has been UDC-compressed and stored. This is because one intermediate piece of data among pieces of data to which UDC compression has been consecutively applied is lost, and thus a reception PDCP layer device fails on UDC decompression of UDC compressed pieces of data after the discarded piece of data and thus discards all the data.

The transmission PDCP layer device may discard the first data and then initialize a transmission UDC buffer to be prepared to newly perform a UDC compression process. The initialization of the UDC buffer may indicate initializing of all the values of the UDC buffer to be 0. In another method, if dictionary information (predefined dictionary) is previously configured by an RRC message, the dictionary information may be indicated to be input as the values of the UDC buffer so as to initialize the values.

The transmission PDCP layer device has not transmitted pieces of raw data (e.g., PDCP SDU) of the discarded pieces of second data (e.g., PDCP PDU) yet after initializing the transmission UDC buffer. Therefore, the transmission PDCP layer device may newly apply a UDC compression process on the pieces of raw data (e.g., PDCP SDU, i.e., raw data to which the PDCP layer device has not applied data processing and which has been received from an upper layer) of the pieces of second data by using the initialized transmission UDC buffer, generate and configure individual UDC headers, and then apply an encoding process or an integrity protection process to perform data transmission.

The transmission PDCP layer device may indicate a UDC header of first data (PDCP PDU) on which the transmission PDCP layer device performs data processing by applying a UDC compression process for the first time after initializing the transmission UDC buffer, by using a one-bit indicator to initialize a reception UDC buffer of the reception PDCP layer device. This is because the reception PDCP layer device is unable to identify data to which UDC compression is newly performed after the initialization of the transmission UDC buffer, and thus the transmission PDCP layer device may use the one-bit indicator of the UDC buffer to allow the reception PDCP layer device to identify the one-bit indicator, initialize a reception UDC buffer, and perform a UDC decompression process on the data first by using the initialized reception UDC buffer. Therefore, if a one-bit indicator of a UDC header of received data (e.g., PDCP PDU) indicates initializing of a reception UDC buffer, the reception PDCP layer device may identify that the transmission UDC buffer has been initialized already and UDC compression has been newly applied to the data. Therefore, the reception PDCP layer device may initialize the reception UDC buffer and apply a UDC decompression process to the data first by using the initialized reception UDC buffer.

According to the (1-2)th embodiment, in a case where a user data compression process is configured, if a part of pieces of data which have been generated already and to which user data compression has been applied is discarded by a PDCP discard timer, pieces of data, each of which has a PDCP sequence number larger than that of the discarded part of data and to which UDC compression has been applied are not transmitted. Therefore, decompression failure or checksum failure which may occurs in a reception PDCP layer device can be reduced, and a waste of transmission resources can be reduced. In addition, a transmission PDCP layer device generates data again from pieces of data which have not been transmitted yet or lastly transmitted data (data corresponding to a PDCP sequence number next to discarded data and thus having been transmitted), so as to prevent data loss. In addition, a transmission PDCP layer device may directly initialize a transmission UDC buffer and newly start UDC compression without having to wait for PDCP control data (PDCP control PDU) indicating initializing of the transmission UDC buffer, which is transmitted due to the occurrence of a checksum failure from a reception PDCP layer device. Therefore, transmission delay can be reduced. In addition, decompression failure or checksum failure does not occur in a reception PDCP layer device. Therefore, the reception PDCP layer device is not required to generate and transmit PDCP control data, and may initialize a reception UDC buffer only according to a one-bit indication of a UDC header, indicated by a transmission PDCP layer device, and newly start UDC decompression. Therefore, the (1-2)th embodiment may be a method led by a transmission node (terminal) for initializing a transmission/reception UDC buffer by using a one-bit indicator of a UDC header.

Specific operations of the (1-2)th embodiment are as follows.

Operation of transmission node: in a case where an uplink data compression process is configured in a transmission PDCP layer device, if data which has not been transmitted yet and has been UDC-compressed is discarded by expiration of a PDCP discard timer, a transmission node may discard all the pieces of data (e.g., PDCP PDU), each of which have a PDCP sequence number larger than that of the discarded data, or which have been generated as PDCP PDUs, to which user data compression has been applied, and which have not been transmitted yet and have been stored. Furthermore, the transmission node may transmit, to a lower layer device, an indicator discarding the pieces of data if the pieces of data have been transferred already to the lower layer device. The transmission PDCP layer device may initialize (reset) a buffer (UDC buffer) for transmission user data compression; assign a new PDCP sequence number or a PDCP sequence number having not been transmitted yet to data from raw data (e.g., PDCP SDU) of first data having not been transmitted yet in an ascending order; perform user data compression again; and perform encoding. When the transmission node generates a UDC header of first data to which UDC compression has been applied for the first time after the initialization of the transmission UDC buffer, the transmission node may define and indicate a new one-bit indicator (e.g., an element indicated by reference numeral 9-05 in FIG. 9) to indicate that the buffer for transmission user data compression has been initialized, or indicate initializing of a reception UDC buffer of a reception node. In addition, the reception node having identified the one-bit indicator of the UDC header may identify that the reception node is required to initialize a buffer for reception user data decompression. In another method, the transmission node may indicate, by using an FR bit, that the buffer for transmission user data compression has been initialized and a reception side is also required to initialize a buffer for reception user data decompression. That is, the terminal may initialize transmission and reception UDC buffers.

In the transmission node, the transmission PDCP layer device may directly start to transmit the newly generated and prepared pieces of data sequentially or in an ascending order based on a PDCP sequence number from data, a UDC header of which indicates that the buffer for transmission user data compression has been initialized and the reception node is also required to initialize the buffer for reception user data decompression. That is, the transmission PDCP layer device may transfer data to a lower layer device.

In another method, when the transmission PDCP layer device may newly apply user data compression, based on raw data (e.g., PDCP SDU) of a piece of discarded data (e.g., PDCP PDU) and apply integrity protection or an encoding process to newly generate pieces of data (e.g., PDCP PDU), the transmission PDCP layer device may assign the newly generated pieces of data (e.g., PDCP PDU) with numbers from a PDCP sequence number or a COUNT value next to a PDCP sequence number or a COUNT value of data (e.g., PDCP PDU) transferred to the lower layer lastly or transmitted lastly. As described above, if the transmission PDCP layer device may assign the newly generated pieces of data (e.g., PDCP PDU) with numbers from a PDCP sequence number or a COUNT value next to a PDCP sequence number or a COUNT value of data (e.g., PDCP PDU) transferred to the lower layer lastly or transmitted lastly, the occurrence of a PDCP sequence number gap is prevented so as to prevent transmission delay which is incurred by a PDCP rearrangement timer triggered by the reception PDCP layer device.

In the (1-2)th embodiment, the terminal may trigger a process of initializing transmission and reception UDC buffers by using a one-bit indicator of a UDC header, by terminal itself before a checksum failure.

Therefore, in a case where a user data compression process is configured, if a part of pieces of data which has been previously generated and to which user data compression has been applied is discarded by a PDCP discard timer, a checksum failure which may occur in pieces of data each having a PDCP sequence number larger than that of the discarded part of data may be reduced, and the transmission node may regenerate pieces of data having not been transmitted yet, so as to prevent data loss.

Operation of reception node: if a UDC header of received data indicates that a buffer for transmission user data compression has been initialized and the reception side is also required to initialize a buffer for reception user data decompression, the reception node may reset a reception node UDC buffer, decode received pieces of data in an ascending order based on a PDCP sequence number, perform user data decompression and processing on the decoded pieces of data, and transfer the pieces of data to an upper layer device.

In the above description of the disclosure, if a user data compression process is configured, and data to which the user data compression process has been applied is received, the reception PDCP layer device may identify a checksum field of a user data compression header of the data. If a checksum failure occurs, the reception PDCP layer device may trigger a PDCP control PDU, configure an indicator indicating that the checksum failure has occurred, and configure and generate the PDCP control PDU to transmit same to the transmission node.

However, the reception PDCP layer device may receive a plurality of pieces of data, and several checksum failures may occur. If the reception node generates a plurality of PDCP control PDUs at every time when a checksum failure occur, and transmits the plurality of PDCP control PDUs to the transmission node, a user data compression buffer of the transmission node is unnecessarily initialized several times, and a user data compression process is incurred again.

Therefore, in order to solve the problem, the disclosure proposes a process in which a PDCP control PDU is not additionally generated and transmitted until a predetermined condition is satisfied after a reception PDCP layer device transmits a PDCP control PDU due to a checksum failure. The above described predetermined condition is that the reception PDCP layer device receives data, among pieces of data received after the transmission of the PDCP control PDU, indicating that a transmission user data compression buffer has been initialized and the data is first data to which user data compression has been applied newly, through a one-bit indicator of a user data compression header of the data. Specifically, a proposed operation of the reception PDCP layer device prevents additional generation of a PDCP control PDU due to a checksum failure until the reception PDCP layer device receives data indicating, through a one-bit indicator of a user data compression header of the data, that a transmission user data compression buffer has been initialized and the data is first data to which user data compression has been applied newly, among pieces of data received after the transmission of the PDCP control PDU due to a checksum failure. Therefore, unnecessary transmission of a PDCP control PDU can be prevented.

In another method, a new timer is employed. When the reception PDCP layer device generates and transmits a PDCP control PDU as described above, the reception PDCP layer device may start the timer, and may not generate an additional PDCP control PDU due to a checksum failure during the operation of the timer. In this case, if the reception PDCP layer device receives data indicating, through a one-bit indicator of a user data compression header, that a transmission user data compression buffer has been initialized and the data is first data to which user data compression has been applied newly, the reception PDCP layer device may stop the timer. If data in which the one-bit indicator is configured is not received until the timer is expired, the reception PDCP layer device may trigger and generate a PDCP control PDU indicating a checksum failure again, after the expiration of the timer and then transmit the PDCP control PDU.

In the above description of the disclosure, if the transmission PDCP layer device has received a PDCP control PDU (a PDCP control PDU including an indicator indicating that a checksum failure has occurred), the transmission PDCP layer device may initialize a transmission user data compression buffer; newly apply a user data compression process on pieces of data which has not been transmitted yet; use a one-bit indicator of a user data compression header of newly compressed first data to indicate that the buffer has been initialized and the data is the newly compressed first data; and transmit the pieces of data.

If a plurality of PDCP control PDUs (a PDCP control PDU including an indicator indicating that a checksum failure has occurred) are received several times, the transmission PDCP layer device may initialize the transmission user data compression buffer several times and newly apply a user data compression process on pieces of data having not been transmitted yet several times, so that unnecessary data processing is incurred and thus the battery of the terminal is wasted and processing load is increased.

Therefore, in order to solve the problem, the disclosure proposes a process in which, if a PDCP control PDU (a PDCP control PDU including an indicator indicating that a checksum failure has occurred) is received, a transmission PDCP layer device initializes a transmission user data compression buffer, newly applies a user data compression process on pieces of data having not been transmitted yet, and ignores an additionally received PDCP control PDU (a PDCP control PDU including an indicator indicating that a checksum failure has occurred) until a predetermined condition is satisfied. The above described predetermined condition is that the transmission PDCP layer device receives a PDCP control PDU, initializes a transmission user data compression buffer, transmits first data to which user data compression has been applied newly, and identifies a successful transfer (RLC ACK) of the first data, from a lower layer device. Specifically, in a proposed operation of the transmission PDCP layer device, the transmission PDCP layer device receives a PDCP control PDU, initializes a transmission user data compression buffer, transmits first data to which user data compression has been performed newly, and ignores an additionally received PDCP control PDU (a PDCP control PDU including an indicator indicating that a checksum failure has occurred) until a successful transfer (RLC ACK) of the first data is identified from a lower layer device. Therefore, unnecessary processing delay due to a plurality of PDCP control PDUs (a PDCP control PDU including an indicator indicating that a checksum failure has occurred) can be prevented (i.e., buffer initialization and data discard and then new compression).

Figure 10:
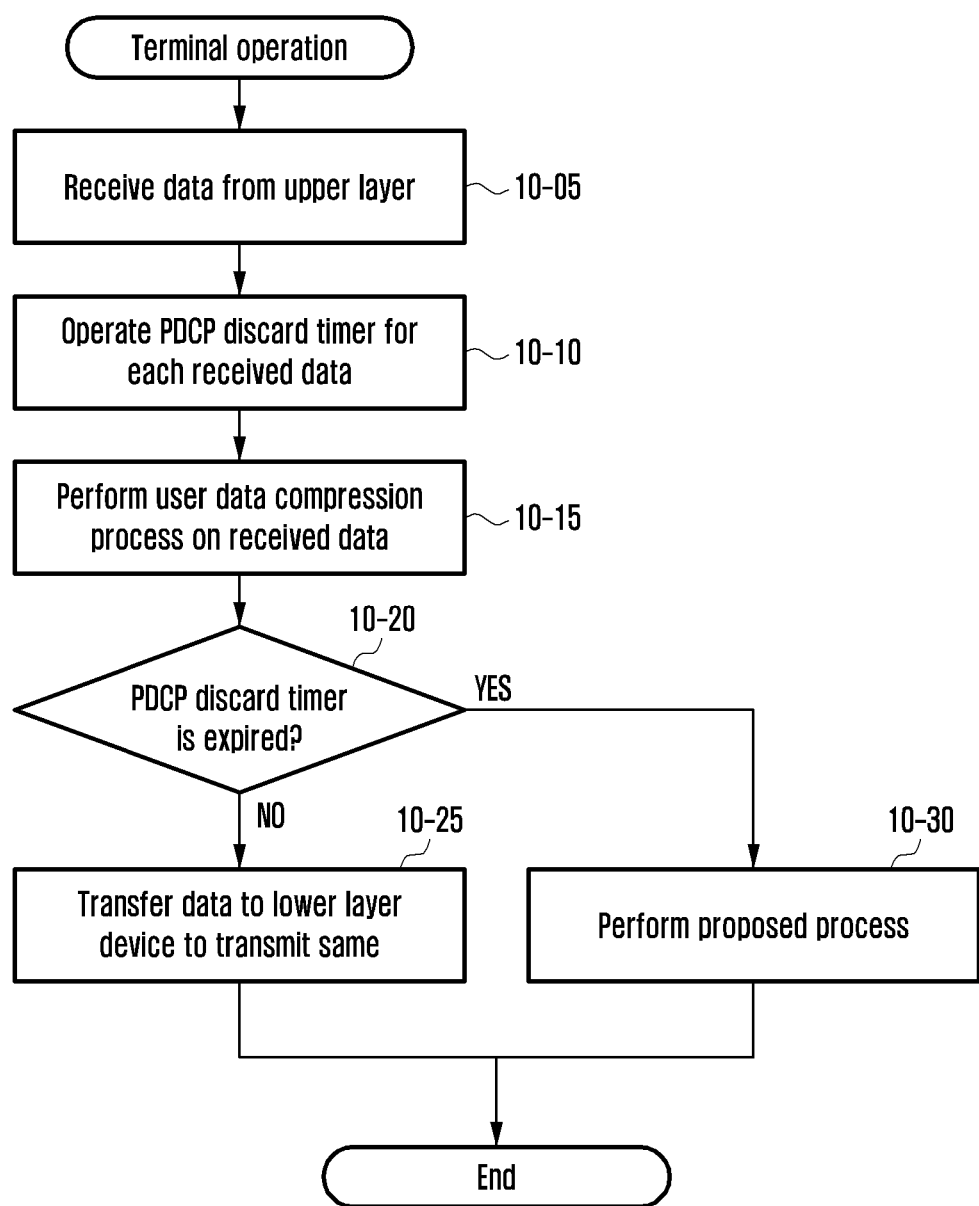
FIG. 10 is a diagram illustrating a terminal operation performed when a transmission node PDCP layer device drives a PDCP discard timer and data having not been transmitted yet and having been subjected to UDC is discarded due to an expiration of the PDCP discard timer according to an embodiment of the disclosure.

FIG. 10 is a diagram illustrating a terminal operation performed when a transmission node PDCP layer device drives a PDCP discard timer and data having not been transmitted yet and having been subjected to a user compression process (e.g., UDC) is discarded due to the expiration of the PDCP discard timer in the disclosure according to an embodiment of the disclosure.

Referring to FIG. 10, a terminal (or transmission node) may operate a PDCP discard timer for each received data at every time when the terminal receives data from an upper layer device (operation 10-05) (operation 10-10). If a PDCP layer device is configured to perform uplink data compression with respect to the data (PDCP SDU), the transmission node performs uplink data compression on the received data. The transmission node performs uplink data compression (UDC), updates a buffer according to the data compression, and configures a transmission UDC buffer. If the transmission node performs uplink data compression (UDC) as described above, the transmission node may compress a PDCP SDU received from an upper layer to be UDC compression data (UDC block) having a smaller size (operation 10-15). The transmission node configures a UDC header relating to the compressed UDC compression data. The UDC header may include an indicator indicating whether uplink data compression has been performed or not (e.g., if a one-bit indicator of the UDC header is 0, this implies UDC has been applied, and if the indicator is 1, this implies UDC has been unapplied).

In the above description, if the terminal performs uplink data compression (UDC) on data (PDCP SDU) received from the upper layer and updates a UDC buffer, the transmission node may calculate checksum bits and include same in the UDC buffer in order to allow a reception node PDCP layer device to check the validity of the updated UDC buffer (the checksum bits have a predetermined length, and may be configured by 4 bits, for example).

The terminal performs integrity protection data to which uplink data decompression has been applied or not as described above, if the integrity protection is configured, encodes (ciphering) the data, and then transfers the data to a lower layer.

If a transmission PDCP layer device discards data which has not been transmitted yet and has been UDC-compressed, by expiration (operation 10-20) of a PDCP discard timer (operation 10-30), the transmission node may transmit data corresponding to a PDCP sequence number next to the discarded data; discard all the pieces of remaining data (pieces of data, each of which have a PDCP sequence number larger than that next to the discarded data, to which user data compression has been applied, and which have not been transmitted yet and have been stored); and transmit, to a lower layer device, an indicator discarding the pieces of data if the pieces of data have been transferred already to the lower layer device. The transmission node may stop data transmission with respect to the transmission PDCP layer device until a PDCP control PDU indicating that a checksum failure has occurred is received. This is because an intermediate piece or a part of the pieces of UDC-compressed data has been discarded, and thus user data compression is performed previously, and it is obvious that a checksum failure relating to pieces of data (e.g., PDCP PDU) each having a PDCP sequence number larger than that of the discarded piece of data will occur in a reception PDCP layer device. Therefore, the transmission node may expect that if the transmission node transmits data corresponding to a PDCP sequence number next to the discarded data, the reception PDCP layer device identifies a checksum failure and transmits a PDCP control PDU to the transmission node.

Therefore, if the transmission PDCP layer device has received a PDCP control PDU indicating that a checksum failure has occurred, or before the PDCP control PDU is received, the transmission PDCP layer device may initialize a transmission buffer for user data compression (if the transmission UDC buffer is initialized previously, the transmission PDCP layer device does not initialize the transmission buffer for user data compression), perform a user data compression process again first on pieces of data, of which a PDCP discard timer has not yet expired and which have not been transmitted yet, or data (data corresponding to a PDCP sequence number next to discarded data and thus having been transmitted), of which a PDCP discard timer has not yet expired and which has been transmitted lastly, assign numbers from a new PDCP sequence number or a first PDCP sequence number which has not been transmitted yet, in an ascending order to encode, generate, and prepare data (e.g., PDCP PDU). The transmission PDCP layer device may restart transmission of the newly generated and prepared pieces of data after the PDCP control PDU indicating that the checksum failure has occurred is received. That is, data may be transferred to a lower layer device.

If a PDCP discard timer is not expired in the transmission PDCP layer device, the transmission node transfers data to the lower layer device to transmit the data to a reception node (operation 10-25).

According to the above described embodiment, in the (1-1)th embodiment, when the transmission node discards data having not been transmitted yet and having been UDC-compressed due to the expiration of a PDCP discard timer, the transmission node may transmit the data without discarding or discard the data; transmit first data having a PDCP sequence number larger than that of the data and having been UDC-compressed; and discard all the pieces of remaining data (pieces of data, each of which have a PDCP sequence number larger than that of the discarded or transmitted data, to which user data compression has been applied, and which have not been transmitted yet and have been stored). In addition, the transmission node may transmit an indicator discarding the pieces of data if same has been transferred already, to the lower layer device. The transmission node may stop data transmission with respect to the transmission PDCP layer device until a PDCP control PDU indicating that a checksum failure has occurred is received. This is because an intermediate piece or a part of the pieces of UDC-compressed data has been discarded, and thus user data compression is performed previously, and it is obvious that a checksum failure relating to pieces of data (e.g., PDCP PDU) each having a PDCP sequence number larger than that of the discarded piece of data will occur in a reception PDCP layer device. Therefore, the transmission node may expect that if the transmission node transmits discarded data or first data having a PDCP sequence number larger than that of the discarded data and having been UDC-compressed, the reception PDCP layer device identifies a checksum failure and transmits a PDCP control PDU to the transmission node.

Therefore, the transmission PDCP layer device may receive a PDCP control PDU indicating that a checksum failure has occurred, or may initialize a transmission buffer for user data compression before the PDCP control PDU is received (if a transmission UDC buffer has been initialized already in the above description, the transmission buffer is not initialized). In addition, the transmission PDCP layer device may perform a user data compression process again first on pieces of data, of which a PDCP discard timer has not yet expired and which have not been transmitted yet, or data (discarded data or first data having a PDCP sequence number larger than that of the discarded data and having been UDC-compressed), of which a PDCP discard timer has not yet expired and which has been transmitted lastly, assign numbers from a new PDCP sequence number or a first PDCP sequence number which has not been transmitted yet, in an ascending order to encode, generate, and prepare data (e.g., PDCP PDU). The transmission PDCP layer device may restart transmission of the newly generated and prepared pieces of data after the PDCP control PDU indicating that the checksum failure has occurred is received. That is, the transmission PDCP layer device may transfer data to the lower layer device.

According to the (1-1)th embodiment, in a case where a user data compression process is configured, if a part of pieces of data which have been generated already and to which user data compression has been applied is discarded by a PDCP discard timer, pieces of data, each of which has a PDCP sequence number larger than that of the discarded part of data and to which UDC compression has been applied are not transmitted. Therefore, decompression failure or checksum failure which may occurs in the reception PDCP layer device can be reduced, and a waste of transmission resources can be reduced. In addition, data is generated again from pieces of data which have not been transmitted yet or lastly transmitted data (data corresponding to a PDCP sequence number next to discarded data and thus having been transmitted), so as to prevent data loss.

In order to solve the problem, in the (1-2)th embodiment, if a transmission PDCP layer device in which a UDC compression process is configured discards first data to which UDC compression has been applied and which has not been transmitted yet, by expiration of a PDCP discard timer, the transmission PDCP layer device may discard the first data and discard all the pieces of second data (e.g., PDCP PDUs) each of which has a PDCP sequence number larger than that of the discard first data and has not been transmitted yet, and has been UDC-compressed and stored. This is because one intermediate piece of data among pieces of data to which UDC compression has been consecutively applied is lost, and thus a reception PDCP layer device fails on UDC decompression of UDC compressed pieces of data after the discard piece of data, and thus discards all the failed pieces of data.

The transmission PDCP layer device may discard the first data and then initialize a transmission UDC buffer to be prepared to newly perform a UDC compression process. The initialization of the UDC buffer may indicate initializing of all the values of the UDC buffer to be 0. In another method, if dictionary information (predefined dictionary) is previously configured by an RRC message, the dictionary information may be indicated to be input as the values of the UDC buffer so as to initialize the values. The transmission PDCP layer device has not transmitted pieces of raw data (e.g., PDCP SDU) of the discarded pieces of second data (e.g., PDCP PDU) yet after initializing the transmission UDC buffer. Therefore, the transmission PDCP layer device may newly apply a UDC compression process on the pieces of raw data (e.g., PDCP SDU, i.e., raw data to which the PDCP layer device has not applied data processing and which has been received from an upper layer) of the pieces of second data by using the initialized transmission UDC buffer, generate and configure individual UDC headers, and then apply an encoding process or an integrity protection process to perform data transmission. The transmission PDCP layer device may indicate a UDC header of first data (PDCP PDU) on which the transmission PDCP layer device performs data processing by applying a UDC compression process for the first time after initializing the transmission UDC buffer, by using a one-bit indicator to initialize a reception UDC buffer of the reception PDCP layer device. This is because the reception PDCP layer device is unable to identify data to which UDC compression is newly performed after the initialization of the transmission UDC buffer, and thus the transmission PDCP layer device may use the one-bit indicator of the UDC buffer to allow the reception PDCP layer device to identify the one-bit indicator, initialize a reception UDC buffer, and perform a UDC decompression process on the data first by using the initialized reception UDC buffer. Therefore, if a one-bit indicator of a UDC header of received data (e.g., PDCP PDU) indicates initializing of a reception UDC buffer, the reception PDCP layer device may identify that the transmission UDC buffer has been initialized already and UDC compression has been newly applied to the data Therefore, the reception PDCP layer device may initialize the reception UDC buffer and apply a UDC decompression process the data first by using the initialized reception UDC buffer.

According to the (1-2)th embodiment, in a case where a user data compression process is configured, if a part of pieces of data which have been generated already and to which user data compression has been applied is discarded by a PDCP discard timer, pieces of data, each of which has a PDCP sequence number larger than that of the discarded part of data and to which UDC compression has been applied are not transmitted. Therefore, decompression failure or checksum failure which may occurs in a reception PDCP layer device can be reduced, and a waste of transmission resources can be reduced. In addition, data is generated again from pieces of data which have not been transmitted yet or lastly transmitted data (data corresponding to a PDCP sequence number next to discarded data and thus having been transmitted), so as to prevent data loss. In addition, a transmission PDCP layer device may directly initialize a transmission UDC buffer and newly start UDC compression without having to wait for PDCP control data (PDCP control PDU) indicating initializing of the transmission UDC buffer, which is transmitted due to the occurrence of a checksum failure from a reception PDCP layer device. Therefore, transmission delay can be reduced. Decompression failure or checksum failure does not occur in a reception PDCP layer device. Therefore, the reception PDCP layer device is not required to generate and transmit PDCP control data, and may initialize a reception UDC buffer only according to a one-bit indication of a UDC header, indicated by a transmission PDCP layer device, and newly start UDC decompression. Therefore, the (1-2)th embodiment may be a method led by a terminal for initializing a transmission/reception UDC buffer by using a one-bit indicator of a UDC header.

In the disclosure, a PDCP SDU may indicate raw data received by the transmission PDCP layer device from an upper layer device, and a PDCP PDU may indicate data which the transmission PDCP layer device is to transmit to a lower layer device after completing data processing. The data processing may include processing such as integrity protection and verification, header compression, user layer data compression, or an encoding process, which are configured in a PDCP layer device. In addition, a PDCP PDU generated through data processing of the PDCP SDU may be separate data different from the PDCP SDU; even if the PDCP PDU is discarded, the PDCP SDU may be stored, and a PDCP SDU may be discarded only by a PDCP data discard timer.

In the follow description in the disclosure, a method for effectively performing a user data compression method (UDC) proposed in the disclosure in a case where a service data adaptation protocol (SDAP) layer device is configured or an SDAP header is configured is proposed.

In the disclosure, the (2-1)th embodiment in which a user data compression method is efficiently performed in a case where an SDAP layer device or an SDAP header is configured by an RRC message is proposed as follows. In the (2-1)th embodiment, an SDAP header is compressed by using a user data compression method, and a UDC header is encoded. According to the (2-1)th embodiment, through the above described features, the same process may be performed on upper layer data regardless of whether an SDAP header exists or not, so as to improve convenience of implementation, and a UDC header may be encoded to reinforce security.

Figure 11:
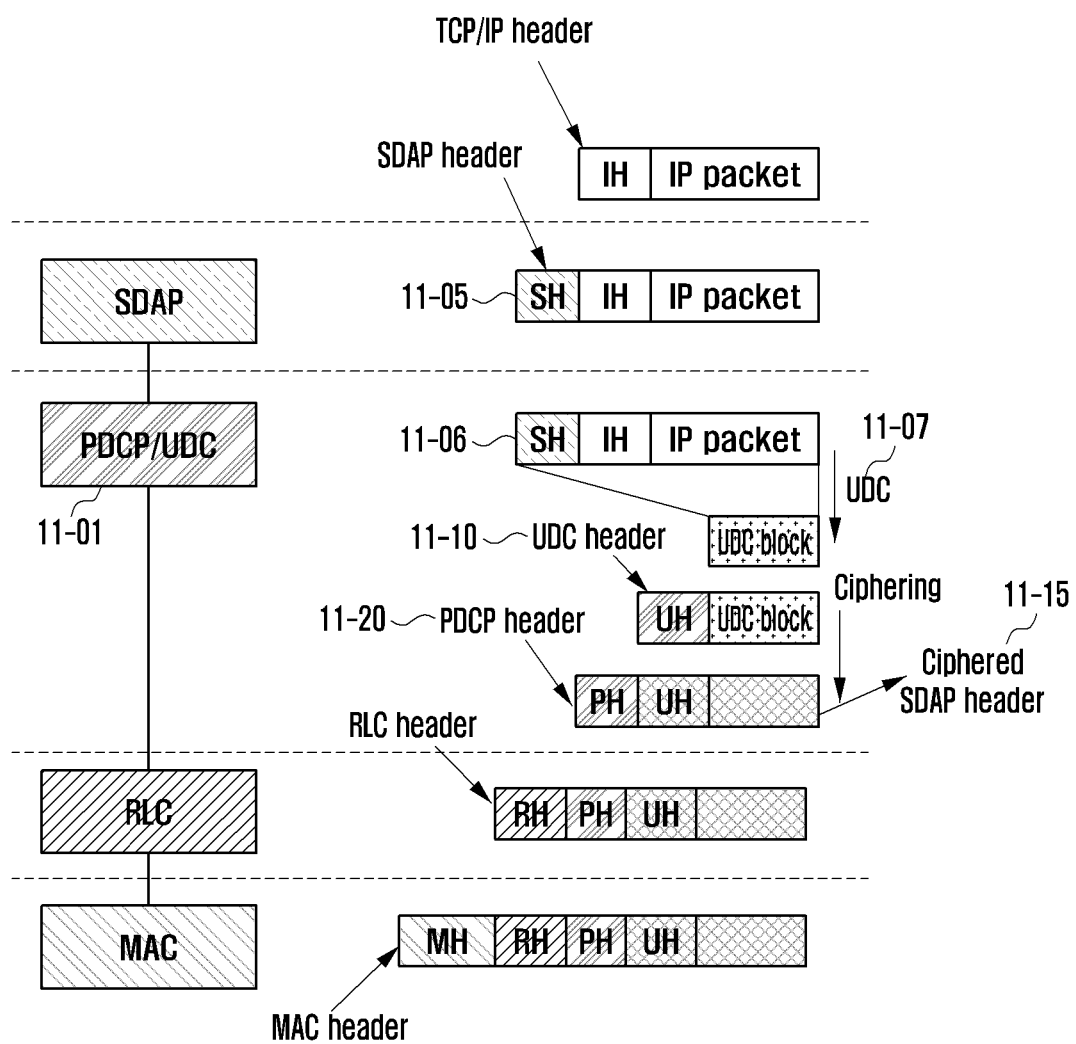
FIG. 11 is a diagram illustrating a (2-1)th embodiment in which a user data compression method is efficiently performed in a case where an SDAP layer device or an SDAP header is configured through an RRC message according to an embodiment of the disclosure.

FIG. 11 is a diagram illustrating the (2-1)th embodiment in which a user data compression method is efficiently performed in a case where an SDAP layer device or an SDAP header is configured through an RRC message according to an embodiment of the disclosure.

Referring to FIG. 11, in a case where an SDAP layer device or an SDAP header is configured to be used by an RRC message, for example, in operation 5-10, 5-40, or 5-75 in FIG. 5, and user data compression (UDC) is configured, if the SDAP layer device receives data from an upper layer, the SDAP layer device may generate and configure an SDAP header as an element indicated by reference numeral 11-05 and transfer the data and the SDAP header to a PDCP layer device. The PDCP layer device 11-01 may perform user data compression on a PDCP SDU (SDAP header and IP packet, as indicated by reference numeral 11-06) received from the upper SDAP layer device (operation 11-07). The PDCP layer device may calculate a checksum field and configure whether UDC has been applied, to generate a UDC header and attach same (as indicated by reference numeral 11-10). The PDCP layer device may encode the UDC header and a compressed UDC block, generate and configure a PDCP header 11-20, bond the PDCP header to the encoded UDC header and UDC block, and then transfer the headers and the UDC block to a lower layer to proceed data processing in an RLC layer device and an MAC layer device.

In the process described with reference to FIG. 11, an SDAP header is compressed by using a user data compression method, a UDC header and an SDAP header 11-15 are encoded. Through the above described features, the same process may be performed on upper layer data regardless of whether an SDAP header exists or not, so as to improve convenience of implementation, and a UDC header may be encoded to reinforce security.

In the disclosure, the (2-2)th embodiment in which a user data compression method is efficiently performed in a case where an SDAP layer device or an SDAP header is configured by an RRC message is proposed as follows. In the (2-2)th embodiment, a user data compression method is not applied to an SDAP header, the SDAP header is not encoded, and a UDC header is encoded. According to the (2-2)th embodiment, through the above described features, QoS information of an SDAP header can be utilized without a decoding process of information of the SDAP header by a transmission node or a reception node. For example, a base station may use the QoS information for scheduling. Furthermore, in a case of implementation of a terminal, there is no need to generate an SDAP header at every time when upper layer data is received, a hardware accelerator may perform a UDC process, perform encoding, and attach an SDAP header later, so as to facilitate the implementation of a terminal. In addition, a UDC header may be encoded to reinforce security.

Figure 12:
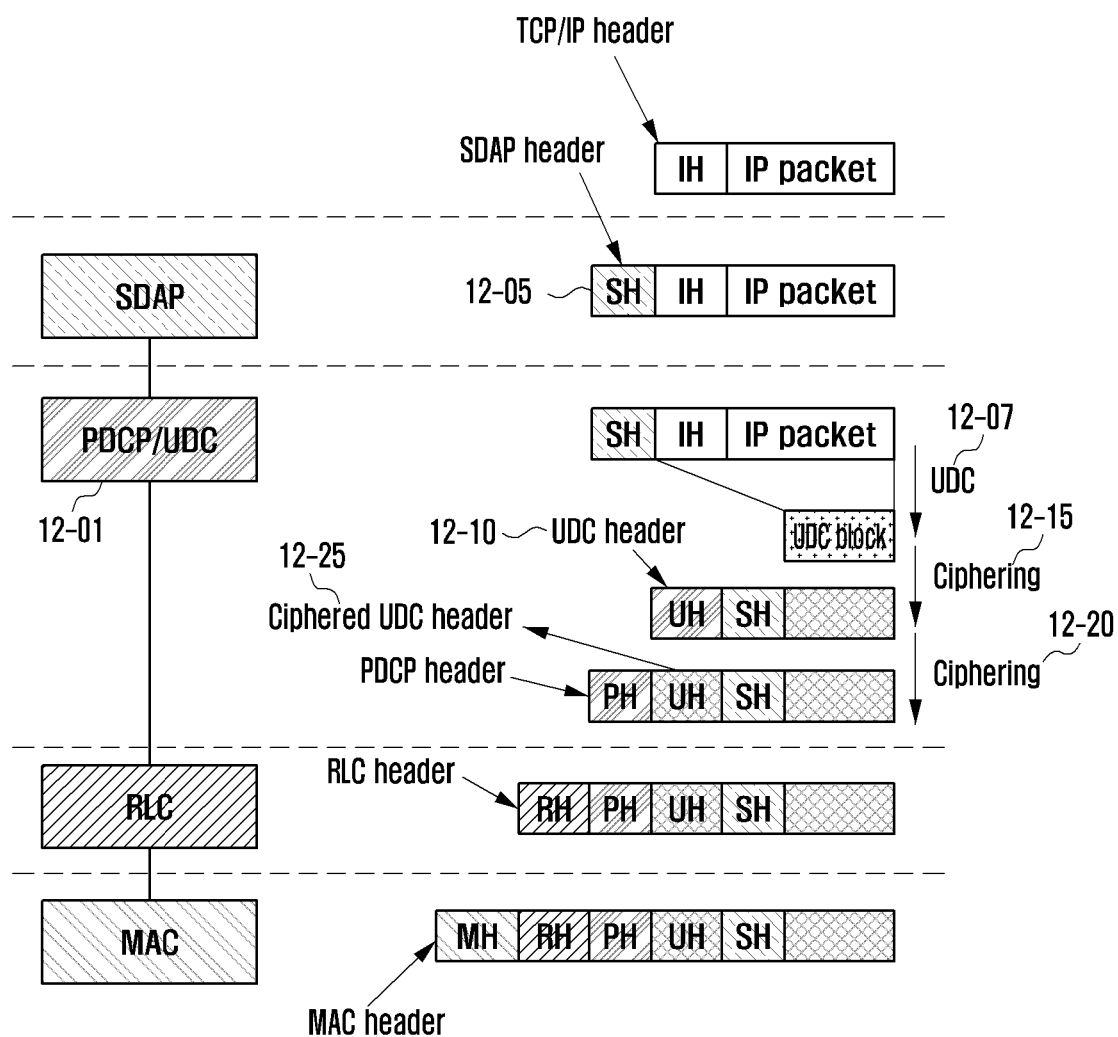
FIG. 12 is a diagram illustrating a (2-2)th embodiment in which a user data compression method is efficiently performed in a case where an SDAP layer device or an SDAP header is configured through an RRC message according to an embodiment of the disclosure.

FIG. 12 is a diagram illustrating the (2-2)th embodiment in which a user data compression method is efficiently performed in a case where an SDAP layer device or an SDAP header is configured through an RRC message in the disclosure according to an embodiment of the disclosure.

Referring to FIG. 12, in a case where an SDAP layer device or an SDAP header is configured to be used by an RRC message, for example, in operation 5-10, 5-40, or 5-75 in FIG. 5, and user data compression (UDC) is configured, if the SDAP layer device receives data from an upper layer, the SDAP layer device may generate and configure an SDAP header as an element indicated by reference numeral 12-05 and transfer the data and the SDAP header to a PDCP layer device. The PDCP layer device 12-01 may perform a user data compression process on a PDCP SDU (SDAP header and remaining data part, excluding an SDAP header from IP packet) received from the upper SDAP layer device (operation 12-07). The PDCP layer device may calculate a checksum field and configure whether UDC has been applied, to generate a UDC header and attach same to the front of the SDAP header (as indicated by reference numeral 12-10). If integrity protection is configured, the PDCP layer device may apply integrity protection to the UDC header and compressed UDC block before an encoding process, and then encode the compressed UDC block and separately encode the UDC header to encode the UDC header and the UDC block (operations 12-15 and 12-20). In order to perform the encoding process only one time, the PDCP layer device may separate the SDAP header in the process of the above described operations, encode the UDC header and the UDC block in one stage, insert the unencoded SDAP header between the UDC header and the UDC block to configure data, generate and configure a PDCP header 12-20 to bond the same to the data, then transfer the data and the PDCP header and UDC header 12-25 to a lower layer to proceed data processing in an RLC layer device and an MAC layer device.

In the disclosure, the (2-3)th embodiment in which a user data compression method is efficiently performed in a case where an SDAP layer device or an SDAP header is configured by an RRC message is proposed as follows. In the (2-3)th embodiment, a user data compression method is not applied to an SDAP header, the SDAP header is not encoded, and a UDC header is also not encoded. Through the above described features, QoS information of an SDAP header can be utilized without a decoding process of information of the SDAP header by a transmission node or a reception node. For example, a base station may use the QoS information for scheduling. Furthermore, in a case of implementation of a terminal, there is no need to generate an SDAP header at every time when upper layer data is received, a hardware accelerator may perform a UDC process, perform encoding, and attach an SDAP header later, so as to facilitate the implementation of a terminal. Furthermore, a UDC header is not encoded either, and thus a user data compression process and an encoding process can be continuously performed on data received from an upper layer by an SDAP layer device, by means of a hardware accelerator, and after data processing of an PDCP layer device is completed, an SDAP header, a UDC header, and a PDCP header, which are generated, can be attached to the very front of data for which the data processing is completed, and then the headers and the data can be transferred to a lower layer. Therefore, implementation of a terminal is simple. In addition, if a UDC header is not encoded in the process, a reception node may firstly read and calculate a checksum field of a UDC header before performing decoding (deciphering), so as to identify the validity of a UDC buffer contents. Therefore, if a checksum failure occurs, the reception node may not perform a decoding process, discard corresponding data immediately, and perform a checksum failure processing process, so as to reduce processing burden.

Figure 13:
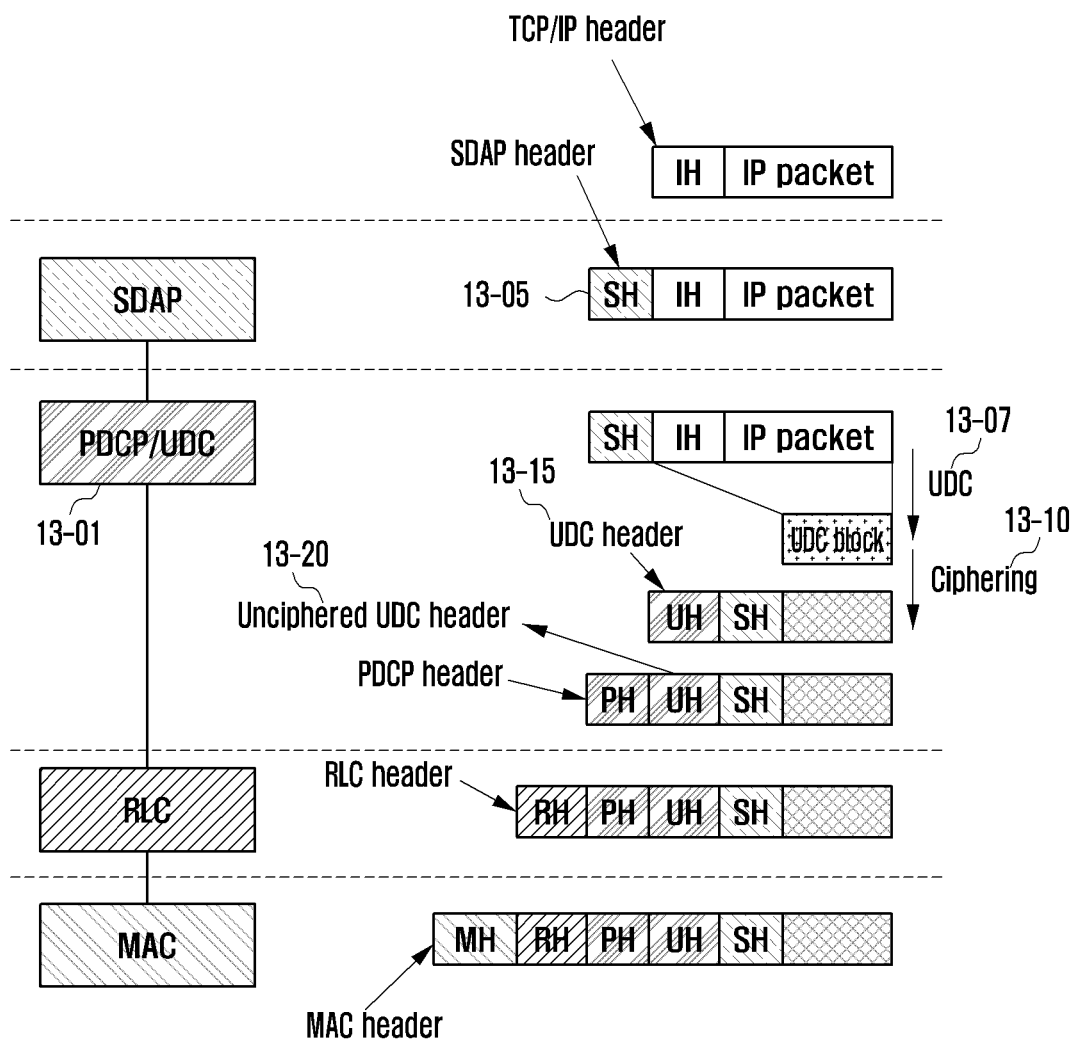
FIG. 13 is a diagram illustrating a (2-3)th embodiment in which a user data compression method is efficiently performed in a case where an SDAP layer device or an SDAP header is configured through an RRC message according to an embodiment of the disclosure.

FIG. 13 is a diagram illustrating the (2-3)th embodiment in which a user data compression method is efficiently performed in a case where an SDAP layer device or an SDAP header is configured through an RRC message in the disclosure according to an embodiment of the disclosure.

Referring to FIG. 13, in a case where an SDAP layer device function or an SDAP header is configured to be used by an RRC message, for example, in operation 5-10, 5-40, or 5-75 in FIG. 5, and user data compression (UDC) is configured, if the SDAP layer device receives data from an upper layer, the SDAP layer device may generate and configure an SDAP header as an element indicated by reference numeral 13-05 and transfer the data and the SDAP header to a PDCP layer device. The PDCP layer device 13-01 may perform user data compression on a PDCP SDU (SDAP header and remaining data part, excluding an SDAP header from IP packet) received from the upper SDAP layer device (operation 13-07). If integrity protection is configured, the PDCP layer device may apply integrity protection to a UDC block having been compressed through the user data compression, a UDC header, an SDAP header, and a PDCP header before an encoding process. The PDCP layer device may encode only the UDC block having been compressed through the user data compression, except the UDC header and the SDAP header (operation 13-10). The PDCP layer device may calculate a checksum field and configure whether UDC has been applied, to generate a UDC header and attach same (operations 13-15 and 13-20). The PDCP layer device may generate, configure, and bond a PDCP header and then transfer the PDCP header to a lower layer to proceed data processing in an RLC layer device and an MAC layer device. As proposed in the above description, if a user data compression is not applied to an SDAP header and encoding is not applied to a UDC header, a user data compression process and an encoding or decoding process is simplified and a complex process is omitted in implementation of a terminal and a base station, so as to simplify a processing process of the implementation and reduce processing burden.

In the disclosure, the (2-4)th embodiment in which a user data compression method is efficiently performed in a case where an SDAP layer device or an SDAP header is configured by an RRC message is proposed as follows. In the (2-4)th embodiment, a user data compression method is not applied to an SDAP header, an SDAP header is not encoded, and a UDC header is encoded. Furthermore, the UDC header is attached to the rear of the SDAP header, or the UDC header is attached to the very front of a compressed UDC block and the SDAP header is attached to the front of the UDC header. Through the above described features, QoS information of an SDAP header can be utilized without a decoding process of information of the SDAP header by a transmission node or a reception node. For example, a base station may use the QoS information for scheduling. Furthermore, in a case of implementation of a terminal, there is no need to generate an SDAP header at every time when upper layer data is received, a hardware accelerator may perform a UDC process, directly generate and attach a UDC header, perform encoding, and attach an SDAP header later, so as to facilitate the implementation of a terminal. In addition, a UDC header may be encoded to reinforce security. In addition, in the embodiment, the position of the SDAP header and the position of the UDC header are changed, so that when a user data compression process is performed, unnecessary processes of performing processing except the SDAP header, or detaching the SDAP header, performing processing, and then attaching the SDAP back can be reduced, and an one integrated process can be performed on a UDC header and a UDC data block.

Figure 14:
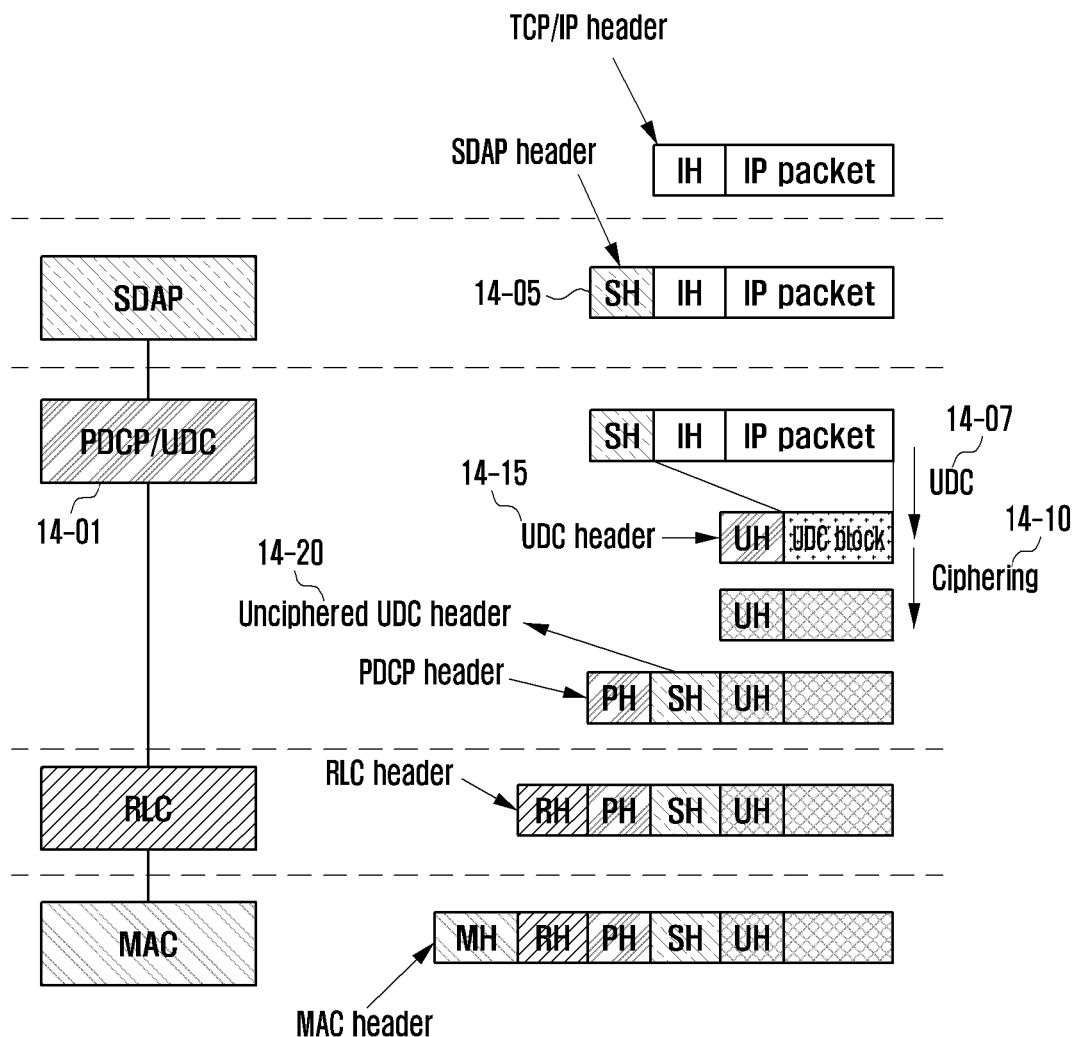
FIG. 14 is a diagram illustrating a (2-4)th embodiment in which a user data compression method is efficiently performed in a case where an SDAP layer device or an SDAP header is configured through an RRC message according to an embodiment of the disclosure.

FIG. 14 is a diagram illustrating the (2-4)th embodiment in which a user data compression method is efficiently performed in a case where an SDAP layer device or an SDAP header is configured through an RRC message in the disclosure according to an embodiment of the disclosure.

Referring to FIG. 14, in a case where an SDAP layer device or an SDAP header is configured to be used by an RRC message, for example, in operation 5-10, 5-40, or 5-75 in FIG. 5, and user data compression (UDC) is configured, if the SDAP layer device receives data from an upper layer, the SDAP layer device may generate and configure an SDAP header as an element indicated by reference numeral 14-05 and transfer the data and the SDAP header to a PDCP layer device. The PDCP layer device 14-01 may perform a user data compression process on a PDCP SDU (SDAP header and remaining data part, excluding an SDAP header from IP packet) received from the upper SDAP layer device (operation 14-07). The PDCP layer device may calculate a checksum field and configure whether UDC has been applied, to generate a UDC header and attach same to the very front of a compressed UDC data block (to the rear of the SDAP header) (as indicated by reference numeral 14-15). If integrity protection is configured, PDCP layer device may apply integrity protection to the SDAP header, the UDC header, the compressed UDC block, and a PDCP header before an encoding process, and then encode the UDC header and the compressed UDC block (operation 14-10). The PDCP layer device may configure data, generate and configure a PDCP header 14-20, bond the SDAP header first, then bond the PDCP header, and then transfer the data and the headers to a lower layer to proceed data processing in an RLC layer device and an MAC layer device.

In the disclosure, the (2-5)th embodiment in which a user data compression method is efficiently performed in a case where an SDAP layer device or an SDAP header is configured by an RRC message is proposed as follows. In the (2-5)th embodiment, a user data compression method is not applied to an SDAP header, an SDAP header is not encoded, and a UDC header is not encoded either. Furthermore, the UDC header is attached to the rear of the SDAP header, or the UDC header is attached to the very front of a compressed UDC block and the SDAP header is attached to the front of the UDC header. Through the above described features, QoS information of an SDAP header can be utilized without a decoding process of information of the SDAP header by a transmission node or a reception node. For example, a base station may use the QoS information for scheduling. Furthermore, in a case of implementation of a terminal, there is no need to attach an SDAP header at every time when upper layer data is received, a hardware accelerator may perform a UDC process, perform encoding, directly generate and attach a UDC header, and attach an SDAP header later, so as to facilitate the implementation of a terminal. In addition, in implementation, a user data compression process and an encoding process may be performed on pieces of data received from an upper layer by an SDAP layer device, by means of a hardware accelerator, and an SDAP header, a UDC header, and a PDCP header may be generated in parallel, so that the headers are bonded together to the front of data output as a result of the hardware accelerator and then transferred to a lower layer to reduce the complexity of terminal implementation. In addition, in the embodiment, the position of the SDAP header and the position of the UDC header are changed, so that when a user data compression process is performed, unnecessary processes of performing processing except the SDAP header, or detaching the SDAP header, performing processing, and then attaching the SDAP header back can be reduced, and an one integrated process can be performed on a UDC header and a UDC data block. In addition, the UDC header is not encoded. Therefore, the reception node can previously identify whether a checksum failure occurs, before performing decoding. If a checksum failure occurs, the reception node can discard data before decoding, and directly perform a checksum failure processing process.

Figure 15:
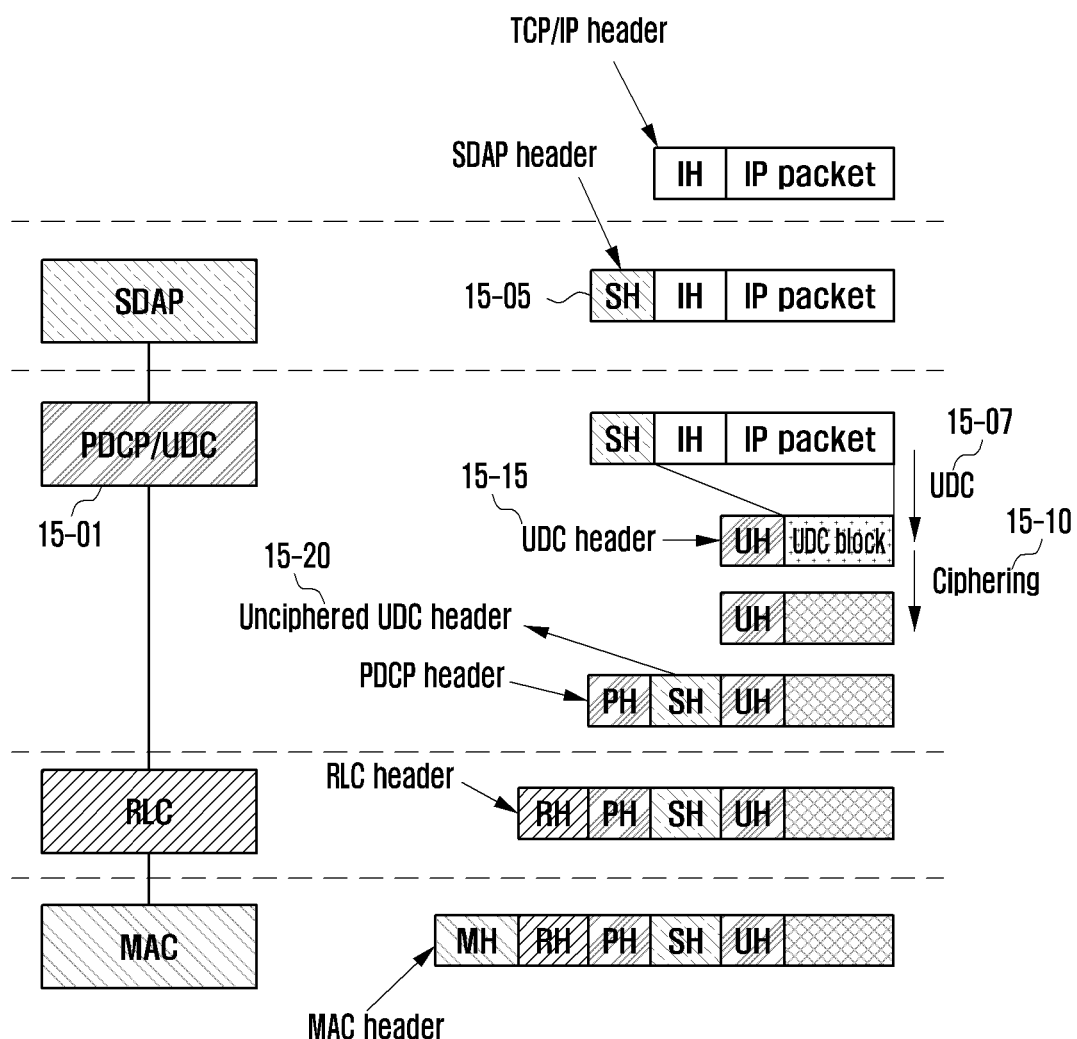
FIG. 15 is a diagram illustrating a (2-5)th embodiment in which a user data compression method is efficiently performed in a case where an SDAP layer device or an SDAP header is configured through an RRC message according to an embodiment of the disclosure.

FIG. 15 is a diagram illustrating the (2-5)th embodiment in which a user data compression method is efficiently performed in a case where an SDAP layer device or an SDAP header is configured through an RRC message in the disclosure according to an embodiment of the disclosure.

Referring to FIG. 15, in a case where an SDAP layer device or an SDAP header is configured to be used by an RRC message, for example, in operation 5-10, 5-40, or 5-75 in FIG. 5, and user data compression (uplink data compression, UDC) is configured, if the SDAP layer device receives data from an upper layer, the SDAP layer device may generate and configure an SDAP header as an element indicated by reference numeral 15-05 and transfer the data and the SDAP header to a PDCP layer device. The PDCP layer device 15-01 may perform a user data compression process on a PDCP SDU (SDAP header and remaining data part, excluding an SDAP header from IP packet) received from the upper SDAP layer device (operation 15-07). The PDCP layer device may calculate a checksum field and configure whether UDC has been applied, to generate a UDC header and attach same to the very front of a compressed UDC data block (to the rear of the SDAP header) (as indicated by reference numeral 15-15). If integrity protection is configured, the PDCP layer device may apply integrity protection to the SDAP header, the UDC header, the compressed UDC block, and a PDCP header before an encoding process, and then encode only the compressed UDC block except the SDAP header and the UDC header (operation 15-10). The PDCP layer device may configure data, generate and configure a PDCP header 15-20, bond the SDAP header first, then bond the PDCP header, and then transfer the data and the headers to a lower layer to proceed data processing in an RLC layer device and an MAC layer device.

In the disclosure, the (2-6)th embodiment in which a user data compression method is efficiently performed in a case where an SDAP layer device or an SDAP header is configured by an RRC message is proposed as follows. In the (2-6)th embodiment, an SDAP header is compressed by using a user data compression method, and a UDC header is not encoded. According to the (2-6)th embodiment, through the above described features, the same process may be performed on upper layer data regardless of whether an SDAP header exists or not, so as to improve convenience of implementation. In addition, the UDC header is not encoded. Therefore, the reception node can previously identify whether a checksum failure occurs, before performing decoding. If a checksum failure occurs, the reception node can discard data before decoding, and directly perform a checksum failure processing process.

Figure 16:
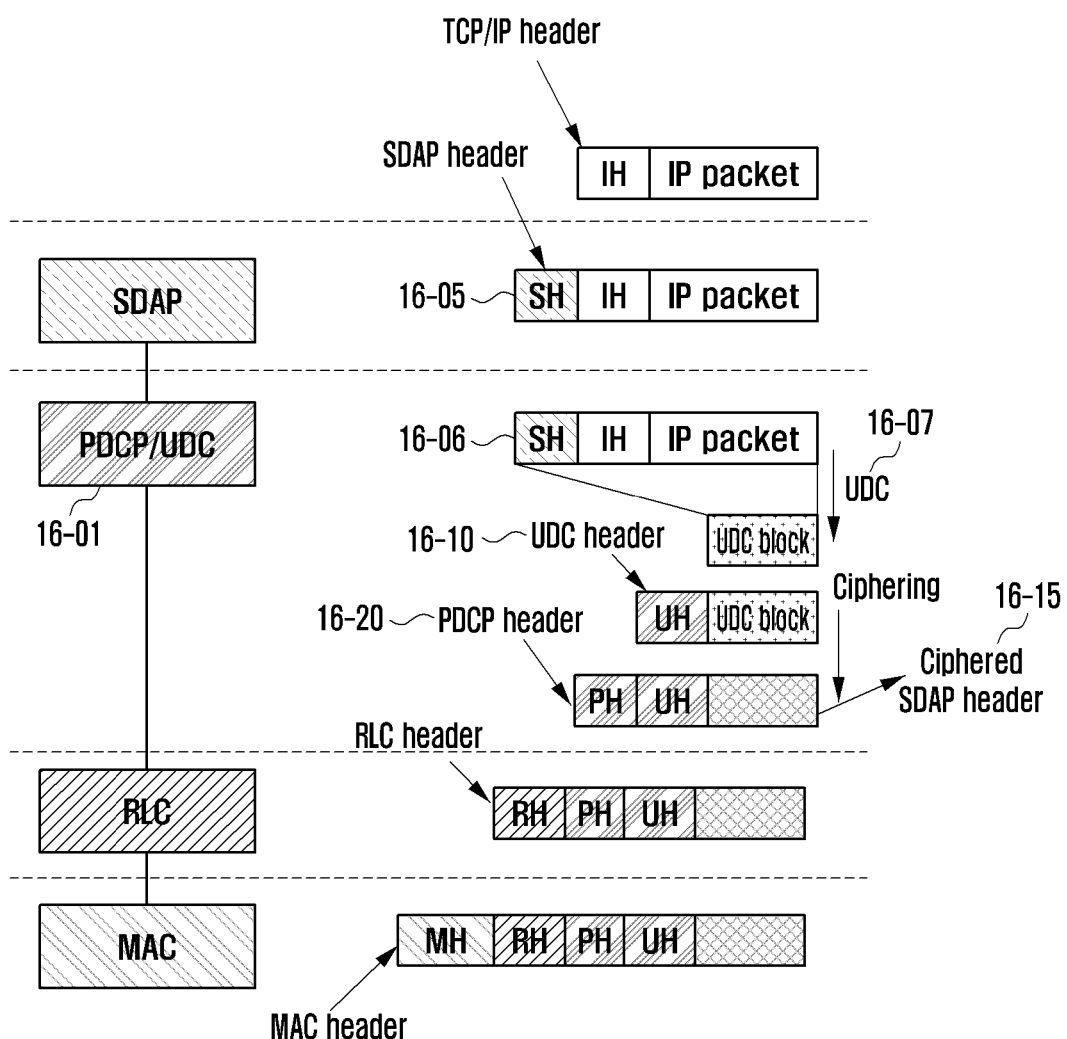
FIG. 16 is a diagram illustrating a (2-6)th embodiment in which a user data compression method is efficiently performed in a case where an SDAP layer device or an SDAP header is configured through an RRC message according to an embodiment of the disclosure.

FIG. 16 is a diagram illustrating the (2-6)th embodiment in which a user data compression method is efficiently performed in a case where an SDAP layer device or an SDAP header is configured through an RRC message in the disclosure according to an embodiment of the disclosure.

Referring to FIG. 16, in a case where an SDAP layer device or an SDAP header is configured to be used by an RRC message, for example, in operation 5-10, 5-40, or 5-75 in FIG. 5, and user data compression (UDC) is configured, if the SDAP layer device receives data from an upper layer, the SDAP layer device may generate and configure an SDAP header as an element indicated by reference numeral 16-05 and transfer the data and the SDAP header to a PDCP layer device. The PDCP layer device 16-01 may perform user data compression on a PDCP SDU (SDAP header and IP packet, as indicated by reference numeral 16-06) received from the upper SDAP layer device (operation 16-07). The PDCP layer device may calculate a checksum field and configure whether UDC has been applied, to generate a UDC header and attach same (as indicated by reference numeral 16-10). The PDCP layer device may encode a compressed UDC block except for the UDC header (as indicated by reference numeral 16-15), generate and configure a PDCP header 16-20, bond the PDCP header to the UDC header, and then transfer the encoded UDC block and the headers to a lower layer to proceed data processing in an RLC layer device and an MAC layer device.

Figure 17:
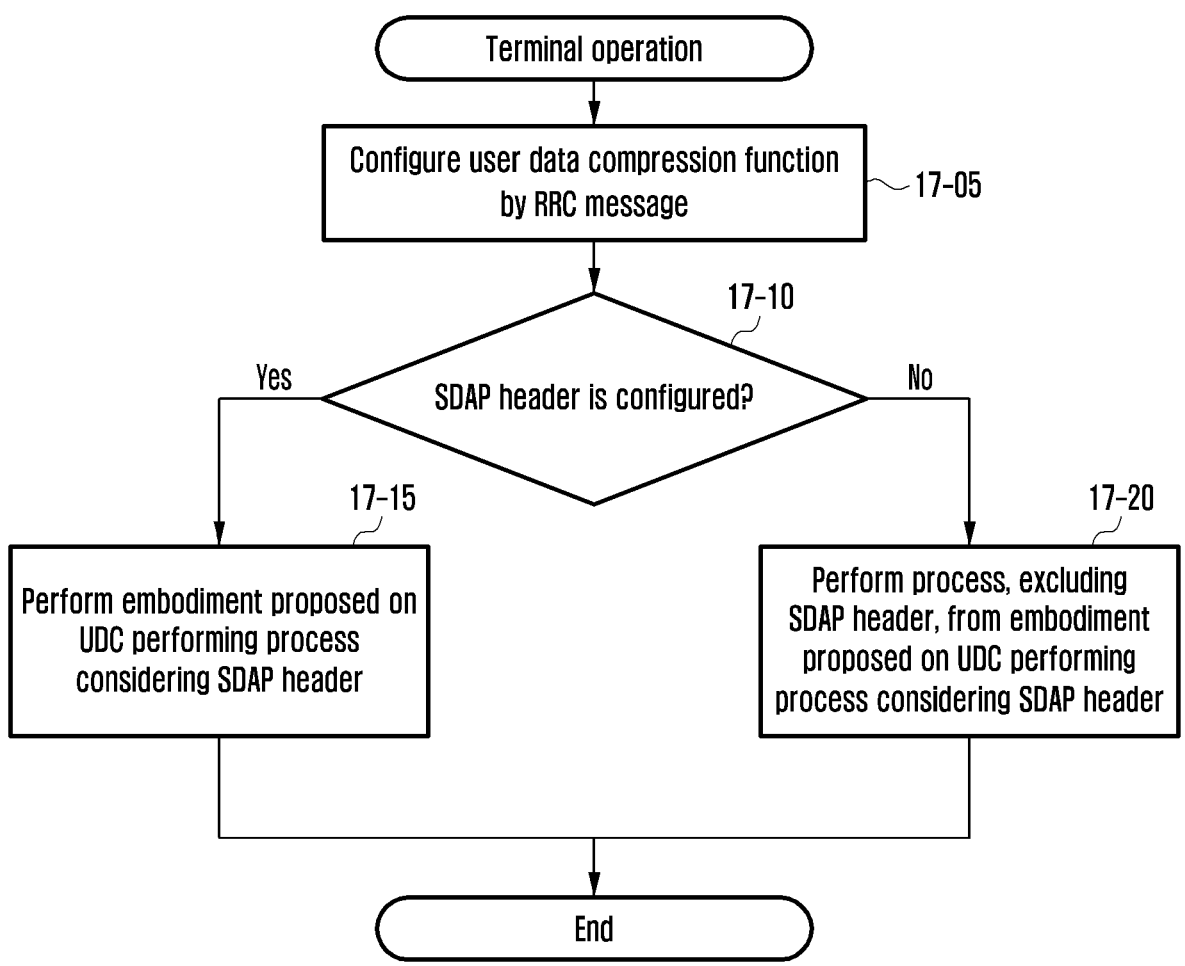
FIG. 17 is a diagram illustrating a terminal operation proposed according to an embodiment of the disclosure.

FIG. 17 is a diagram illustrating a terminal operation according to an embodiment of the disclosure.

Referring FIG. 17, a terminal may be configured to apply a user data compression function by an RRC message, for example, in operation 5-10, 5-40, or 5-75 in FIG. 5 (operation 17-05). In addition, if an SDAP layer device or an SDAP header is configured to be used in the RRC message (operation 17-10), the (2-1)th embodiment, the (2-2)th embodiment, the (2-3)th embodiment, the (2-4)th embodiment, the (2-5)th embodiment, or the (2-6)th embodiment in which a user data compression method is efficiently performed when an SDAP layer device or an SDAP header is configured in the disclosure may be performed (operation 17-15). However, if an SDAP layer device or an SDAP header is configured not to be used in the RRC message (operation 17-10), a process, excluding data processing on an SDAP header, from the (2-1)th embodiment, the (2-2)th embodiment, the (2-3)th embodiment, the (2-4)th embodiment, the (2-5)th embodiment, or the (2-6)th embodiment in which a user data compression method is efficiently performed when an SDAP layer device or the SDAP header is configured in the disclosure may be performed without change (operation 17-20).

In the above disclosure, various cases which may occur due to generation of an SDAP header, an encoding process (ciphering), and an uplink data compression process (UDC) and the implementation methods according thereto are described and proposed.

In the above description, whether an SDAP header is used for each bearer may be configured by a base station through an RRC message as described with reference to FIG. 5, and whether UDC is applied for each bearer may be also configured by a base station through an RRC message as described above.

In the following description, the disclosure proposes preventing of simultaneous use of an SDAP header and UDC with respect to one bearer when a base station configures whether an SDAP header is used for each bearer and whether UDC is applied for each bearer, through an RRC message (The SDAP header cannot be configured for a DRB configured with UDC or Both SDAP header and UDC cannot be configured for a DRB or Either SDAP header or UDC can be configured for a DRB, not both). That is, a base station may be prohibited from configuring use of an SDAP header and application of UDC together for one bearer through an RRC message.

As described above, when a UDC process is performed for a bearer for which UDC is configured, an SDAP header is generated and unencoded, and thus the UDC process is complex and implementation complexity increases. The UDC is applied to uplink data, and configuring of an SDAP header for uplink data corresponds to configuring of remapping between a bearer and a flow. However, the configuring of an SDAP header for uplink data may be not suitable for the case where UDC is used. This is because a UDC process requires synchronization of a transmission node and a reception node for data compression, and thus it is very inefficient to perform remapping between a bearer and flows on a bearer to which UDC has been applied. Therefore, if use of an SDAP header and configuration of UDC are not configured together for one bearer in order to solve the complexity problem, the complex problems described above may not occur. Therefore, the disclosure proposes, as another embodiment, that a base station does not allow use of an SDAP header and configuration of UDC to be configured together for one bearer for a terminal When the base station does not configure use of an SDAP header and configuration of UDC together for one bearer for the terminal, a UDC header may be encoded to reinforce security. That is, if upper layer data is received, data compression may be performed through a UDC process and a UDC header may generated, then the UDC header and a compressed UDC data block may be encoded, a PDCP header may be generated, and connected and bonded to the front of the encoded UDC header and UDC data block, and they may be transferred to a lower layer.

In another method, when the base station does not configure use of an SDAP header and configuration of UDC together for one bearer for the terminal, a checksum field of a UDC header may be quickly identified to quickly determine whether to discard UDC data, so that the number of times of decoding processes can be reduced. That is, a UDC header may not be encoded. That is, if upper layer data is received, data compression may be performed through a UDC process, a compressed data block may be encoded, a UDC header and a PDCP header may be generated, and connected and bonded to the front of the encoded UDC data block, and they may be transferred to a lower layer. Therefore, a reception PDCP layer device may identify a UDC header before decoding; identify the validity of UDC through a checksum field; and if it is not valid, does not perform decoding and immediately discard the received data. Only data, the validity of which has been identified through the checksum field, may be decoded and subjected to a user data decompression process.

In addition, similarly, an integrity verification protection process may also occur a complex implementation problem when the process is configured for one bearer together with use of an SDAP header or application of UDC. Therefore, use of an SDAP header and integrity verification protection may be not allowed to be configured together for one bearer. In addition, integrity verification and application of UDC may be not allowed to be configured together for one bearer.

Figure 18:
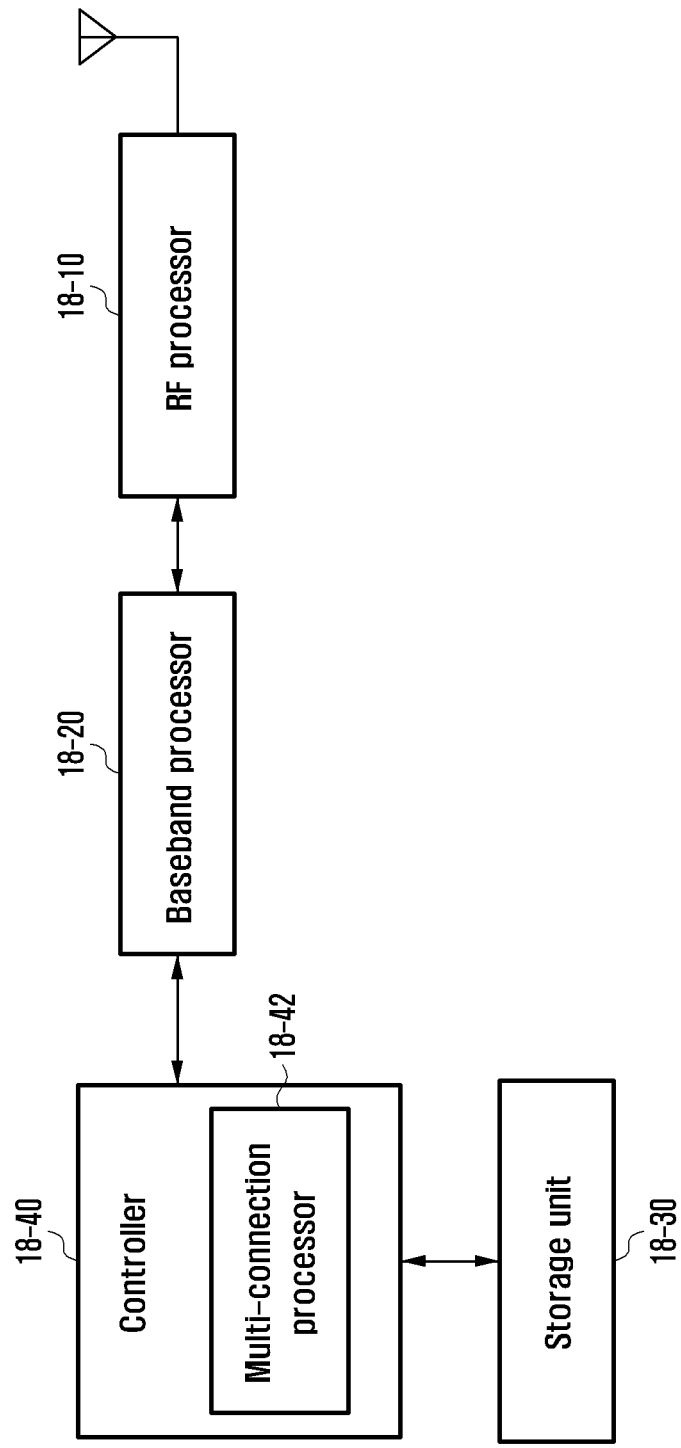
FIG. 18 illustrates a structure of a terminal to which an embodiment may be applied according to an embodiment of the disclosure.

FIG. 18 illustrates a structure of a terminal to which an embodiment may be applied according to an embodiment of the disclosure.

Referring to FIG. 18, the terminal includes a radio frequency (RF) processor 18-10, a baseband processor 18-20, a storage unit 18-30, and a controller 18-40.

The RF processor 18-10 performs a function, such as signal band change, amplification, etc., for transmitting or receiving a signal through a wireless channel That is, the RF processor 18-10 may upconvert a baseband signal provided from the baseband processor 18-20, into an RF band signal, and then transmit the RF band signal through an antenna, and may downconvert an RF band signal received through the antenna, into a baseband signal. For example, the RF processor 18-10 may include a transmission filter, a reception filter, an amplifier, a mixer, an oscillator, a digital-to-analog converter (DAC), an analog-to-digital converter (ADC), and the like. In FIG. 18, only one antenna is illustrated, but the terminal may include a plurality of antennas. In addition, the RF processor 18-10 may include a plurality of RF chains. Furthermore, the RF processor 18-10 may perform beamforming. To perform the beamforming, the RF processor 18-10 may adjust the phase and size of each of signals transmitted or received through a plurality of antennas or antenna elements. In addition, the RF process may perform MIMO, and may receive several layers when a MIMO operation is performed. The RF processor 18-10 may properly configure a plurality of antennas or antenna elements according to a control of the controller to perform reception beam sweeping or adjust the direction and the beam width of a reception beam to be in conjunction with a transmission beam.

The baseband processor 18-20 performs a function of conversion between a baseband signal and a bit stream according to a physical layer protocol of a system. For example, when data is transmitted, the baseband processor 18-20 generates complex symbols by encoding and modulating a transmission bit stream. In addition, when data is received, the baseband processor 18-20 reconstructs a reception bit stream by demodulating and decoding a baseband signal provided from the RF processor 18-10. For example, in a case where an orthogonal frequency division multiplexing (OFDM) scheme is applied, when data is transmitted, the baseband processor 18-20 generates complex symbols by encoding and modulating a transmission bit stream, maps the complex symbols to subcarriers, and then configures OFDM symbols through inverse fast Fourier transform (IFFT) calculation and cyclic prefix (CP) insertion. In addition, when data is received, the baseband processor 18-20 divides a baseband signal provided from the RF processor 18-10, by the units of OFDM symbols, reconstructs signals mapped to subcarriers, through fast Fourier transform (FFT) calculation, and then reconstructs a reception bit stream through demodulation and decoding.

The baseband processor 18-20 and the RF processor 18-10 transmit and receive a signal as described above. Accordingly, the baseband processor 18-20 and the RF processor 18-10 may be called a transmitter, a receiver, a transceiver, or a communication unit. Furthermore, at least one of the baseband processor 18-20 and the RF processor 18-10 may include a plurality of communication modules to support a plurality of different wireless access technologies. In addition, at least one of the baseband processor 18-20 and the RF processor 18-10 may include different communication modules to process signals in different frequency bands. For example, different wireless access technologies may include LTE network, NR network, etc. In addition, different frequency bands may include a super high frequency (SHF) (e.g., 2.5 GHz and 5 GHz) band, a millimeter (mm) wave (e.g., 60 GHz) band, etc.

The storage unit 18-30 stores data such as a basic program, an application program, and configuration information for an operation of the terminal. The storage unit 18-30 provides stored data in response to a request of the controller 18-40.

The controller 18-40 controls overall operations of the terminal. For example, the controller 18-40 transmits or receives a signal through the baseband processor 18-20 and the RF processor 18-10. In addition, the controller 18-40 records and reads data in and from the storage unit 18-40. To this end, the controller 18-40 may include at least one processor. For example, the controller 18-40 may include a communication processor (CP) performing a control for communication, and an application processor (AP) controlling a higher layer, such as an application program. The controller 18-40 may further include a multi-connection processor 18-42 configured to support multi-connection.

Figure 19:
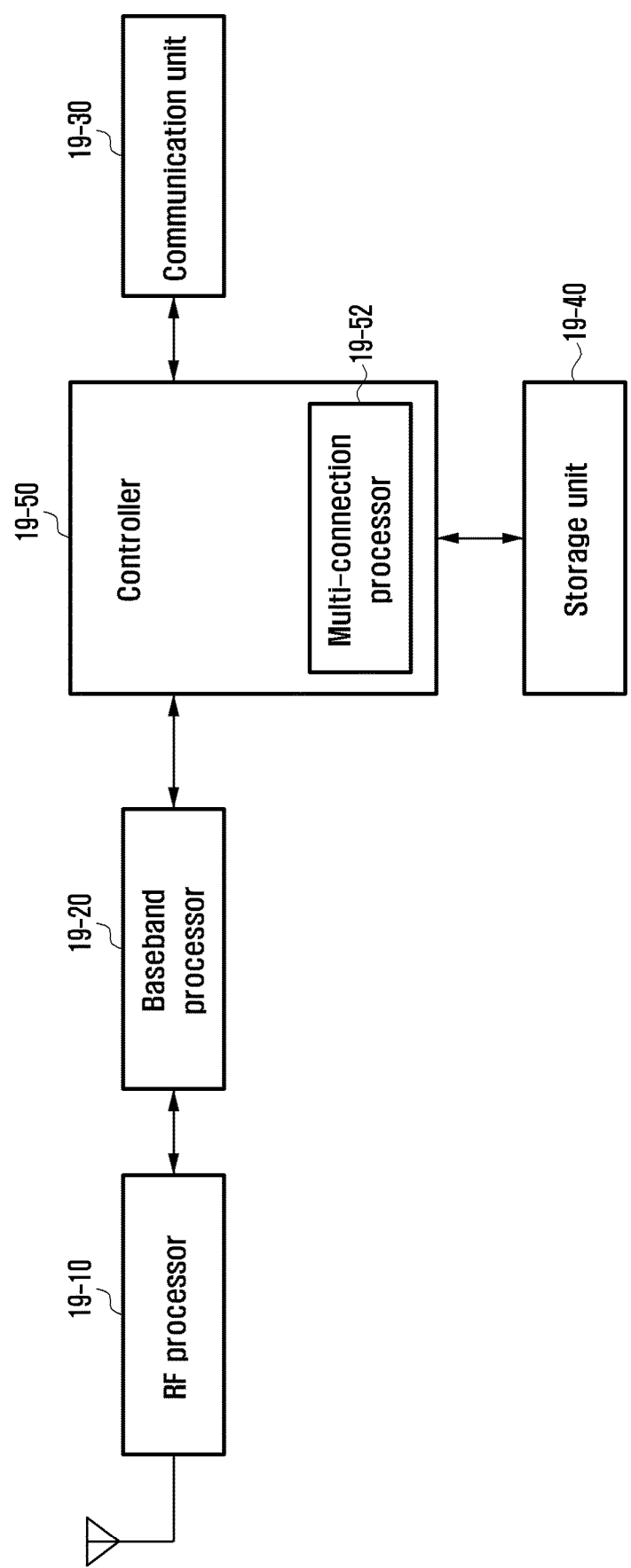
FIG. 19 illustrates a block configuration of a base station (or transmission and reception point (TRP)) in a wireless communication system to which an embodiment may be applied according to an embodiment of the disclosure.

FIG. 19 illustrates a block configuration of a TRP in a wireless communication system to which an embodiment may be applied according to an embodiment of the disclosure.

Referring to FIG. 19, the base station includes a RF processor 19-10, a baseband processor 19-20, a backhaul communication unit 19-30, a storage unit 19-40, and a controller 19-50.

The RF processor 19-10 performs a function, such as signal band change, amplification, etc., for transmitting or receiving a signal through a wireless channel That is, the RF processor 19-10 may upconvert a baseband signal provided from the baseband processor 19-20, into an RF band signal, and then transmit the RF band signal through an antenna, and may downconvert an RF band signal received through the antenna, into a baseband signal. For example, the RF processor 19-10 may include a transmission filter, a reception filter, an amplifier, a mixer, an oscillator, a DAC, an ADC, and the like. In FIG. 19, only one antenna is illustrated, but the first access node may include a plurality of antennas. In addition, the RF processor 19-10 may include a plurality of RF chains. Furthermore, the RF processor 19-10 may perform beamforming. To perform the beamforming, the RF processor 19-10 may adjust the phase and size of each of signals transmitted or received through a plurality of antennas or antenna elements. The RF processor may perform a downlink MIMO operation by transmitting at least one layer.

The baseband processor 19-20 performs a function of conversion between a baseband signal and a bit stream according to a physical layer protocol of a first wireless access technology. For example, when data is transmitted, the baseband processor 19-20 generates complex symbols by encoding and modulating a transmission bit stream. In addition, when data is received, the baseband processor 19-20 reconstructs a reception bit stream by demodulating and decoding a baseband signal provided from the RF processor 19-10. For example, in a case where an OFDM scheme is applied, when data is transmitted, the baseband processor 19-20 generates complex symbols by encoding and modulating a transmission bit stream, maps the complex symbols to subcarriers, and then configures OFDM symbols through IFFT calculation and CP insertion. In addition, when data is received, the baseband processor 19-20 divides a baseband signal provided from the RF processor 19-10, by the units of OFDM symbols, reconstructs signals mapped to subcarriers, through FFT calculation, and then reconstructs a reception bit stream through demodulation and decoding. The baseband processor 19-20 and the RF processor 19-10 transmit and receive a signal as described above. Accordingly, the baseband processor 19-20 and the RF processor 19-10 may be called a transmitter, a receiver, a transceiver, a communication unit, or a wireless communication unit.

The communication unit 19-30 provides an interface for performing communication with other nodes within a network.

The storage unit 19-40 stores data such as a basic program, an application program, and configuration information for an operation of the main base station. Particularly, the storage unit 19-40 may store information relating to a bearer assigned to a connected terminal, a measurement result reported from a connected terminal, etc. In addition, the storage unit 19-40 may store information serving as a determination criterion of whether to provide or stop providing multi-connection to a terminal. The storage unit 19-40 provides stored data in response to a request of the controller 19-50.

The controller 19-50 controls overall operations of the main base station. For example, the controller 19-50 transmits or receives a signal through the baseband processor 19-20 and the RF processor 19-10, or through the backhaul communication unit 19-30. In addition, the controller 19-50 records and reads data in and from the storage unit 19-40. To this end, the controller 19-50 may include at least one processor. The controller 19-50 may further include a multi-connection processor 19-52 configured to support multi-connection.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a transmitting device in a wireless communication system, the method comprising:
   identifying an expiration of a packet data convergence protocol (PDCP) discard timer for a first PDCP protocol data unit (PDU) which is not transmitted to a receiving device;
   transmitting, to the receiving device, a second PDCP PDU subsequent to the first PDCP PDU, wherein a user data compression (UDC) buffer is used for generating the first PDCP PDU and the second PDCP PDU;
   discarding PDCP PDUs which were generated after the first PDCP PDU and initializing the UDC buffer, wherein a first one among the PDCP PDUs has a sequence number (SN) greater than a SN of the second PDCP PDU;
   generating PDCP PDUs by performing a compression for PDCP service data units (SDUs), wherein the compression is performed starting from a PDCP SDU corresponding to the second PDCP PDU based on the initialized UDC buffer;
   receiving, from the receiving device, a PDCP control PDU indicating a checksum failure; and
   transmitting, to the receiving device, the generated PDCP PDUs based on a reception of the PDCP control PDU.

2. The method of claim 1, wherein the checksum failure is occurred based on the second PDCP PDU.

3. The method of claim 1, wherein a transmission of the generated PDCP PDUs is stopped until the PDCP control PDU is received.

4. The method of claim 1, wherein the transmitting device is a terminal and the receiving device is a base station.

5. A transmitting device in a wireless communication system, the transmitting device comprising:
a transceiver configured to transmit or receive a signal; and
a controller configured to:
identify an expiration of a packet data convergence protocol (PDCP) discard timer for a first PDCP protocol data unit (PDU) which is not transmitted to a receiving device,
transmit, to the receiving device, a second PDCP PDU subsequent to the first PDCP PDU, wherein a user data compression (UDC) buffer is used for generating the first PDCP PDU and the second PDCP PDU,
discard PDCP PDUs which were generated after the first PDCP PDU and initializing the UDC buffer, wherein a first one among the PDCP PDUs has a sequence number (SN) greater than a SN of the second PDCP PDU,
generate PDCP PDUs by performing a compression for PDCP service data units (SDUs), wherein the compression is performed starting from a PDCP SDU corresponding to the second PDCP PDU based on the initialized UDC buffer,
receive, from the receiving device, a PDCP control PDU indicating a checksum failure, and
transmit, to the receiving device, the generated PDCP PDUs based on a reception of the PDCP control PDU.

6. The transmitting device of claim 5, wherein the checksum failure is occurred based on the second PDCP PDU.

7. The transmitting device of claim 5, wherein the controller is further configured to stop a transmission of the generated PDCP PDUs until the PDCP control PDU is received.

8. The transmitting device of claim 5, wherein the transmitting device is a terminal and the receiving device is a base station.

9. A method performed by a system including a transmitting device and a receiving device, the method comprising:
identifying, by the transmitting device, an expiration of a packet data convergence protocol (PDCP) discard timer for a first PDCP protocol data unit (PDU) which is not transmitted to a receiving device;
transmitting, by the transmitting device to the receiving device, a second PDCP PDU subsequent to the first PDCP PDU, wherein a user data compression (UDC) buffer is used for generating the first PDCP PDU and the second PDCP PDU;
discarding, by the transmitting device, PDCP PDUs which were generated after the first PDCP PDU and initializing the UDC buffer, wherein a first one among the PDCP PDUs has a sequence number (SN) greater than a SN of the second PDCP PDU;
generating PDCP PDUs by performing, by the transmitting device, a compression for PDCP service data units (SDUs), wherein the compression is performed starting from a PDCP SDU corresponding to the second PDCP PDU based on the initialized UDC buffer;
receiving, by the transmitting device from the receiving device, a PDCP control PDU indicating a checksum failure; and
transmitting, by the transmitting device to the receiving device, the generated PDCP PDUs based on a reception of the PDCP control PDU.

10. The method of claim 9, wherein the checksum failure is occurred based on the second PDCP PDU.

11. The method of claim 10, wherein a transmission of the generated PDCP PDUs is stopped by the transmitting device until the PDCP control PDU is received from the receiving device.

12. The method of claim 9, wherein the transmitting device is a terminal and the receiving device is a base station.

13. A system comprising:
a transmitting device; and
a receiving device,
wherein the transmitting device is configured to:
identify an expiration of a packet data convergence protocol (PDCP) discard timer for a first PDCP protocol data unit (PDU) which is not transmitted to a receiving device,
transmit, to the receiving device, a second PDCP PDU subsequent to the first PDCP PDU, wherein a user data compression (UDC) buffer is used for generating the first PDCP PDU and the second PDCP PDU,
discard PDCP PDUs which were generated after the first PDCP PDU and initializing the UDC buffer, wherein a first one among the PDCP PDUs has a sequence number (SN) greater than a SN of the second PDCP PDU,
generate PDCP PDUs by performing a compression for PDCP service data units (SDUs), wherein the compression is performed starting from a PDCP SDU corresponding to the second PDCP PDU based on the initialized UDC buffer,
receive, from the receiving device, a PDCP control PDU indicating a checksum failure, and
transmit, to the receiving device, the generated PDCP PDUs based on a reception of the PDCP control PDU.

14. The system of claim 13, wherein the checksum failure is occurred based on the second PDCP PDU.

15. The system of claim 14, wherein the controller of the transmitting device is further configured to stop a transmission of the generated PDCP PDUs until the PDCP control PDU is received from the receiving device.

16. The system of claim 13, wherein the transmitting device is a terminal and the receiving device is a base station.

* * * * *